United States Patent
Brisebois et al.

(10) Patent No.: US 8,265,613 B2
(45) Date of Patent: Sep. 11, 2012

(54) ENTERPRISE FEMTO BASED KIOSK

(75) Inventors: Arthur Richard Brisebois, Cumming, GA (US); Robert Klein, Manchester, CT (US)

(73) Assignee: AT&T Mobility II LLC, Atlanta, GA (US)

( * ) Notice: Subject to any disclaimer, the term of this patent is extended or adjusted under 35 U.S.C. 154(b) by 46 days.

(21) Appl. No.: 12/485,209

(22) Filed: Jun. 16, 2009

(65) Prior Publication Data

US 2010/0318417 A1    Dec. 16, 2010

(51) Int. Cl.
*H04B 5/00* (2006.01)
(52) U.S. Cl. ......... 455/414.3; 455/41.2; 455/522; 455/444; 455/423; 455/435.1; 455/422.1; 455/404.1; 455/426.2; 455/432.3; 455/439; 455/412.1; 455/419; 455/420
(58) Field of Classification Search .......... 370/328; 455/41.2, 41.3, 41.1
See application file for complete search history.

(56) References Cited

U.S. PATENT DOCUMENTS

| | | | |
|---|---|---|---|
| 2007/0183427 A1* | 8/2007 | Nylander et al. | 370/395.2 |
| 2008/0132167 A1* | 6/2008 | Bent et al. | 455/41.2 |
| 2008/0255870 A1* | 10/2008 | Butler | 705/1 |
| 2009/0219865 A1* | 9/2009 | Salzer et al. | 370/329 |

* cited by examiner

*Primary Examiner* — Charles Appiah
*Assistant Examiner* — Randy Peaches
(74) *Attorney, Agent, or Firm* — Turocy & Watson, LLP

(57) ABSTRACT

Methods and apparatus for employing femto technology in an enterprise kiosk are presented herein. A content component can receive multimedia content from a base station coupled to a core network. Further, a transfer component can wirelessly transfer the received multimedia content to a mobile device utilizing a femto based wireless protocol based on, at least in part, a sale of the received multimedia content. A database component can store the received multimedia content in a data store, and the transfer component can wirelessly transfer the stored multimedia content to the mobile device utilizing the femto based wireless protocol. The transfer component can alternatively record the received multimedia content in a removable data storage device.

26 Claims, 33 Drawing Sheets

SYSTEM 1200

ADVERTISEMENT COMPONENT 1010

TRACKING COMPONENT 810

NOTICE COMPONENT 820

PROFILE COMPONENT 1310

FIG. 12

SYSTEM 1400

PROFILE COMPONENT 1310

ADVERTISEMENT COMPONENT 810

FIG. 14

SYSTEM 1700

BILLING COMPONENT 1610

PROFILE COMPONENT 1310

FIG. 17

ENTERPRISE FEMTO BASED KIOSK

TECHNICAL FIELD

This disclosure relates generally to implementing an enterprise femto based kiosk.

BACKGROUND

Businesses provide many ways for consumers to purchase multimedia content, e.g., movies, music, video games, etc. For example, "brick and mortar" establishments sell movies, music, and video games stocked on shelves or kiosks. Selling such goods, however, involves various labor costs concerning ordering, stocking, and restocking the goods. Moreover, there can be significant delay between a time multimedia content is released for production and a time the multimedia content is sold on store shelves because the media must be manufactured, shipped, and stocked.

The above-described deficiencies of today's communication networks and related technologies are merely intended to provide an overview of some of the problems of conventional systems, and are not intended to be exhaustive. Other problems with the state of the art, and corresponding benefits of some of the various non-limiting embodiments described herein, may become further apparent upon review of the following detailed description.

SUMMARY

The following presents a simplified summary of the innovation to provide a basic understanding of some aspects described herein. This summary is not an extensive overview of the disclosed subject matter. It is not intended to identify key or critical elements of the disclosed subject matter or delineate the scope of the subject innovation. Its sole purpose is to present some concepts of the disclosed subject matter in a simplified form as a prelude to the more detailed description that is presented later.

The subject disclosure relates to methods and apparatus that employ femto technology in an enterprise kiosk. Femto technology utilizes femto cells, which are wireless access points that can interface with a wired or wireless broadband network. Femto cells usually use a licensed radio spectrum operated and controlled by a wireless service provider, and are generally deployed to improve indoor wireless coverage. Moreover, femto cells can be used to reduce loading of over-the-air radio resources, e.g., radio frequency channels, of a mobility radio access network (RAN) operated by the wireless service provider. User equipment (UE), e.g., mobile device, cell phone, wireless communications device, can be operated by a subscriber of the wireless service provider within a femto coverage area comprising femto cell(s).

The UE typically communicates with a core network, e.g., wired broadband network, via a femto access point (AP) utilizing a femto based wireless protocol. The femto AP employs a backhaul network, e.g., broadband wired network backbone, to route packet communication, e.g., voice traffic, data traffic, data, etc., to the core network. Typically, the UE can register with the femto AP, and communication, such as voice and/or data traffic, can be routed to the subscriber via the femto AP—utilizing the femto based wireless protocol. As used herein, the phrases "femto based wireless protocol," "femto wireless protocol," or "femto based communication," refer generally to a wireless protocol used to route data between a femto AP and UE, e.g., utilizing the licensed radio spectrum described above. Further, the phrases "femto based kiosk," "enterprise femto based kiosk," or "femto kiosk," as used herein, can encompass, but are not limited to encompassing, a structure and/or stand alone device that can be used to sell merchandise and/or services, or to provide information, via a femto based wireless protocol.

Conventional techniques for selling merchandise, e.g., movies, music, video games, etc. within business establishments are inefficient due to labor costs associated with ordering, shipping, stocking, restocking, and performing inventory of the media. Moreover, consumer enjoyment of such media can be significantly delayed between a time when media content is licensed for commercial sale and a time when the media content is packaged, ordered, shipped, inventoried, stocked, and sold.

Compared to conventional techniques for selling multimedia content, various methods and apparatus described herein reduce business costs and improve customer satisfaction by downloading multimedia content onto a portable device and/or storage media via a femto based kiosk. Conventionally, femtocells are usually deployed to improve indoor wireless coverage associated with a wireless device, e.g., cell phone; however, in contrast to these and other conventional uses of femto technology, the various methods and apparatus described herein utilize femto technology within enterprise femto based kiosk(s)—reducing labor costs and improving customer satisfaction related to selling movies, music, video games, and any other media content within a retail establishment.

According to one aspect of the disclosed subject matter, a content component can receive, e.g., at a femto based kiosk, multimedia content from a base station coupled to a core network. The multimedia content can comprise any form of audio and/or visual content, e.g., a movie, a video game, electronic coupons, content associated with in-store promotions, and/or any other content that can be sensed via audio and/or visual means. The core network can comprise various cellular wireless technologies, e.g., Third Generation Partnership Project (3GPP) Universal Mobile Telecommunication System (UMTS), Global System for Mobile Communication (GSM), etc. In addition, wireless communication between the femto based kiosk and the core network can be facilitated utilizing the base station. The base station can communicate with the core network, e.g., transfer multimedia content from the core network to the base station, via one or more backhaul links that can be wired, e.g., optical fiber backbone, twisted-pair line, T1/E1 phone line, synchronous or asynchronous digital subscriber line (DSL), asymmetric DSL (ADSL), coaxial cable, or wireless, e.g., based on a wireless telecommunication or radio technology described below.

A transfer component can wirelessly transfer the received multimedia content to a mobile device utilizing a femto based wireless protocol based on, at least in part, a sale of the received multimedia content. The mobile device can be any wireless mobile device, e.g., cellular phone, personal data assistant (PDA), handheld device, computing device, processing device connected to a wireless modem, etc., that can wirelessly communicate with the femto based kiosk utilizing the femto based wireless protocol. Moreover, the sale can be initiated by a consumer and/or a business associated with the femto based kiosk. In this way, consumers can purchase multimedia content from "brick and mortar" retailers in a way that improves their buying experience(s) and reduces retail cost(s).

According to another aspect of the disclosed subject matter, a database component can store the received multimedia content in a data store, e.g., located at the femto based kiosk. The data store can comprise any removable/non-removable storage medium, and can be used by the database component to proactively store multimedia content for "ready" wireless transfer to one or more femto equipped mobile devices. In yet another aspect, the transfer component can record the received multimedia content, regardless of whether it is stored in the data store, onto a removable data storage device based on, at least in part, the sale of the received multimedia content. For example, the transfer component can record the multimedia content on a compact disk (CD), digital video disc (DVD), Blu-ray Disc™ (BD), smart card, flash memory device (e.g., card, stick, key drive), or other type of removable data storage device after the sale of the received multimedia content.

Aspects, features, or advantages of the disclosed subject matter can be exploited in substantially any wireless telecommunication or radio technology, e.g., wireless fidelity (Wi-Fi), Worldwide Interoperability for Microwave Access (WiMAX); Enhanced General Packet Radio Service (Enhanced GPRS); 3GPP Long Term Evolution (LTE); Third Generation Partnership Project 2 (3GPP2) Ultra Mobile Broadband (UMB); 3GPP UMTS; High Speed Packet Access (HSPA); High Speed Downlink Packet Access (HSDPA); High Speed Uplink Packet Access (HSUPA), LTE Advanced, etc.

Additionally, substantially all aspects of the disclosed subject matter can include legacy telecommunication technologies, e.g., plain old telephone service (POTS). It should be appreciated that selections of radio technology include second generation (2G), third generation (3G), and fourth generation (4G) evolution of the radio technology; however, such selections are not intended as a limitation of the disclosed subject matter and related aspects thereof. In addition, the aspects, features, or advantages of the disclosed subject matter can be exploited in disparate electromagnetic frequency bands.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

FIG. 12 illustrates a demonstrative system that directs advertisements to a user, in accordance with an embodiment.

FIG. 14 illustrates a demonstrative system that directs marketing and/or advertisements to a user, in accordance to an embodiment.

FIG. 17 illustrates a demonstrative system that adjusts a billing rate associated with the sale of multimedia content based on received input, in accordance with an embodiment.

DETAILED DESCRIPTION

Figure 1:
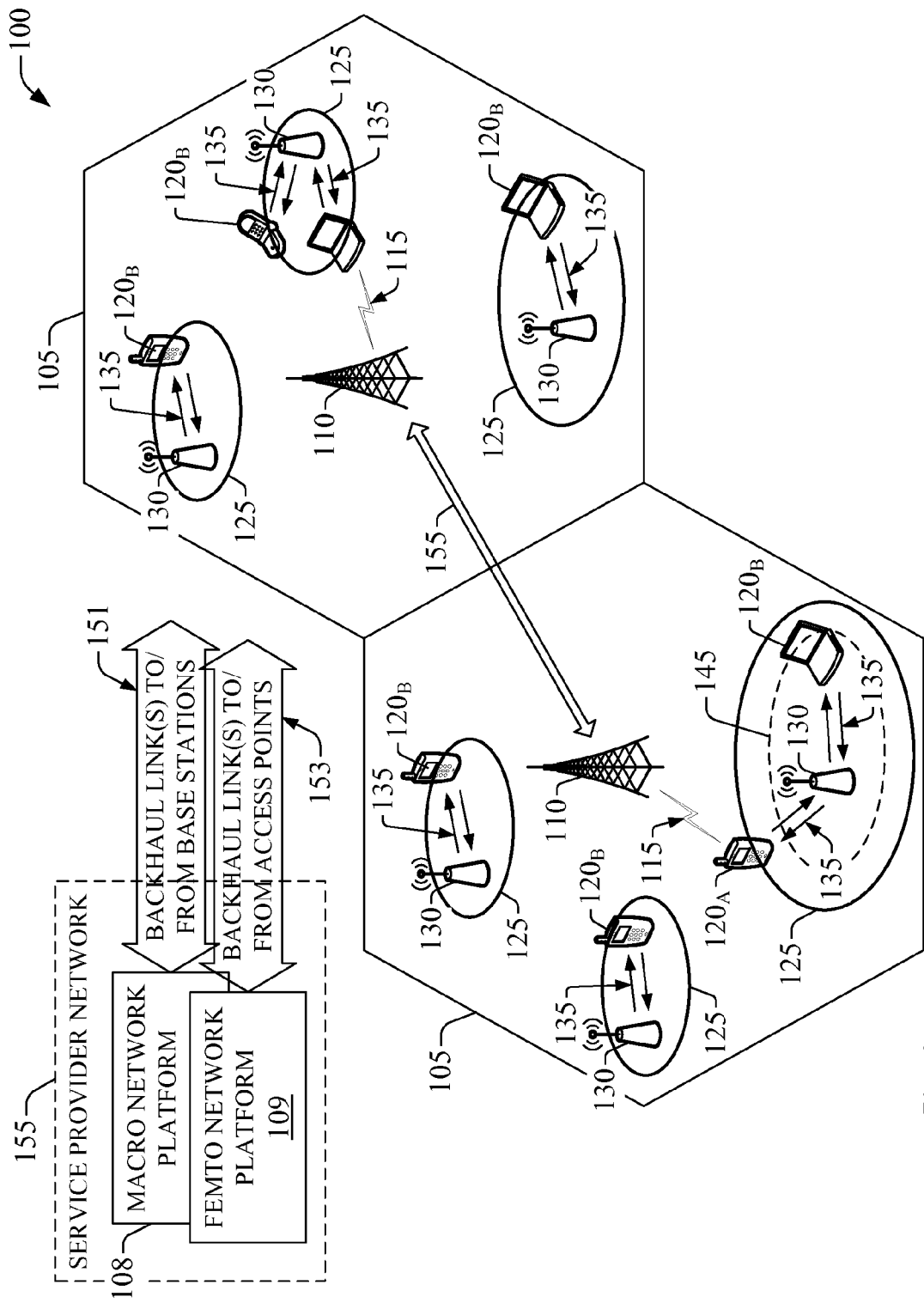
FIG. 1 illustrates a wireless environment that includes macro cells and femto cells for wireless coverage, in accordance with an embodiment.

Various non-limiting embodiments of methods and apparatus are provided that employ femto technology in an enterprise kiosk.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a process running on a processor, a processor, an object, an executable, a program, a storage device, and/or a computer. By way of illustration, an application running on a server and the server can be a component. One or more components can reside within a process and a component can be localized on one computer and/or distributed between two or more computers.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems (e.g., utilizing explicitly and/or implicitly trained classifiers) can be employed in connection with performing inference and/or probabilistic determinations and/or statistical-based determinations as in accordance with one or more aspects of the disclosed subject matter as described herein. For example, an artificial intelligence system can be used, via tracking component 810 (described below), to automatically determine an optimal encoding scheme for a mobile device and encode received multimedia content based on the determined optimal encoding scheme. In another example, the artificial intelligence system can be used, via content management component 2010 (described below), to automatically update stored multimedia content. In yet another example, the artificial intelligence system can automatically launch a browsing and/or purchasing application on user equipment (UE), e.g., based on a message sent via notice component 820 (described below).

As used herein, the term "infer" or "inference" refers generally to the process of reasoning about or inferring states of the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example. Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD); smart card(s), flash memory device(s) (e.g., card, stick, key drive).

Moreover, terms like "user equipment" (UE), "mobile station," "mobile subscriber station," "access terminal," "terminal," "handset," "appliance," "machine", and similar terminology refer to a wireless device utilized by a subscriber or user of a wireless communication service to receive and/or convey data associated with voice, video, sound, and/or substantially any data-stream or signaling-stream. Further, the foregoing terms are utilized interchangeably in the subject specification and related drawings. Likewise, the terms "access point" (AP), "base station," "Node B," "evolved Node B," "home Node B" (HNB), "home access point" (HAP), and the like are utilized interchangeably in the subject specification and drawings and refer to a wireless network component or apparatus that sends and/or receives data associated with voice, video, sound, and/or substantially any data-stream or signaling-stream between a set of subscriber stations—unless context warrants particular distinction(s) among the terms. Further, the data and signaling streams can be packetized or frame-based flows.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, that can provide simulated vision, sound recognition, decision making, etc. Also, the terms "access point," "femto cell access point," "femto access point," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

In one non-limiting aspect, methods and apparatus are provided for employing femto technology in an enterprise kiosk. Femto cells are wireless access points interfaced to a wired broadband network, and are generally deployed to improve indoor wireless coverage. Further, femto cells can be used to reduce loading of over-the-air radio resources, e.g., radio frequency channels, of a mobility radio access network (RAN) operated by a wireless service provider. Femto cells use licensed radio spectrum operated and controlled by the wireless service provider. User equipment (UE) operated by a subscriber within a femto coverage area typically communicates with a core network via a femto access point (AP). Typically, the UE can register with the femto AP and communication, e.g., voice traffic, data traffic, can be routed to the subscriber through the femto AP utilizing a femto based wireless protocol, e.g., based on a licensed or unlicensed radio spectrum. The femto AP can employ a backhaul network, e.g., broadband wired or wireless network backbone, to route packet communication, e.g., voice traffic, data traffic, data, to the core network.

FIG. 1 illustrates a wireless environment 100 that includes macro cells 105 and femto cells 125 for wireless coverage, in accordance with an embodiment. Each macro cell 105 represents a "macro" cell coverage area—macro cell 105 is served by base station 110. It should be appreciated that macro cells 105 are illustrated as hexagons; however, macro cells 105 can adopt other geometries generally dictated by a deployment or floor plan of the macro cell coverage area, or covered geographic area, e.g., metropolitan statistical area (MSA), rural statistical area (RSA), etc. Macro cell coverage is generally intended to serve mobile wireless devices, e.g., UE $120_A$, in outdoor locations. An over-the-air wireless link 115 provides the macro coverage, and wireless link 115 comprises a downlink (DL) and an uplink (UL) (both not shown) that utilize a predetermined band of radio frequency (RF) spectrum. As an example, UE $120_A$ can be a Third Generation Partnership Project (3GPP) Universal Mobile Telecommunication System (UMTS) mobile phone.

It is noted that base station 110—including associated electronics, circuitry and/or components—and wireless link 115 form a radio access network (RAN). In addition, base station 110 communicates with macro network platform 108 via backhaul link(s) 151—macro network platform 108 represents a core network comprising one or more cellular wireless technologies, e.g., 3GPP UMTS, Global System for Mobile Communication (GSM). In one aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul pipe(s) 155 can link disparate base stations 110 based on macro network platform 108.

A group of femto cells 125 served by respective femto access points (APs) 130 can be deployed within each macro cell 105. While three femto cells 125 are deployed per macro cell 105 as shown in FIG. 1, aspects of the subject disclosure can be directed to femto cell deployments with substantive femto AP 130 density, e.g., $10^4$-$10^8$ femto APs 130 per base station 110. Femto cell 125 typically covers an area (or coverage area) that includes confined area 145, which is determined, at least in part, by transmission power allocated to femto AP 130, path loss, shadowing, etc. While the confined area 145 and coverage area typically coincide, it should be appreciated that in certain deployment scenarios, the coverage area can include an outdoor portion, e.g., parking lot, patio deck, recreation area; while confined area 145 can be enclosed by a building, e.g., home, retail store, business. The coverage area typically is spanned by a coverage radius ranging from 20 to 100 meters. Confined area 145 is generally associated with an indoor space and/or building, such as a residential space, e.g., house, condominium, apartment complex, etc.; business space, e.g., retail store, mall, etc.; or public space, e.g., library, hospital, etc. Such spaces can span about 5000 sq. ft.

Femto AP 130 typically serves a few (e.g., 2-5) wireless devices, e.g., UE $120_A$ and subscriber station $120_B$, within the coverage area associated with femto cell 125—each wireless device coupled to femto AP 130 via a wireless link 135 that comprises a downlink and an uplink (depicted as arrows in FIG. 1). A femto network platform 109 can control such service(s), in addition to registering femto APs, provisioning femto APs, managing macro-to-femto handover, and managing femto-to-macro handover. Control or management is facilitated by access point backhaul link(s) 153 that connect deployed femto APs 130 with femto network platform 109. Access point backhaul link(s) 153 are substantially similar to backhaul link(s) 151.

Femto network platform 109 also includes components, e.g., nodes, gateways, interfaces, that facilitate packet-switched (PS), e.g., internet protocol (IP), traffic and signal generation for networked telecommunication. It should be appreciated that femto network platform 109 can integrate seamlessly with substantially any PS-based and/or circuit switched (CS)-based network (such as macro network platform 108). Thus, operation with a wireless device such as $120_A$ is substantially seamless when handover from femto-to-macro, or vice versa, takes place.

As an example, femto AP 130 can integrate into an existing 3GPP Core Network via various interfaces, for example: via an interface between a Ratio Network Controller (RNC) and a Circuit Switched Core Network (CS-CN) (or Iu-CS interface); via an interface between an RNC and a Packet Switched Core Network (or Iu-PS interface); via an interface between a Serving General Packet Radio Service Support Node (SGSN) and a public data network (PDN) (or Gi interface); via an interface between SGSN and other SGSNs (or Gn interface).

Substantially all voice or data active sessions associated with subscribers within femto cell coverage, e.g., coverage area associated with femto cell 125, are terminated once the femto AP 130 is shut down; however, for data sessions, data can be recovered at least in part through a buffer, e.g., memory, associated with a femto gateway at femto network platform 109. Coverage of a suspended (or hotlined) subscriber station, or an associated account, can be blocked, e.g., over an associated air-interface. If a suspended or hotlined customer who owns a femto AP 130 is in Hotline/Suspend status, there is no substantive impact to customers covered through the subject femto AP 130. In another aspect, femto AP 130 can exploit high-speed downlink packet access via an interface with macro network platform 108, or through femto network platform 109, in order to accomplish substantive bitrates.

In addition, in yet another aspect of the subject disclosure, femto AP 130 has a LAC (location area code) and RAC (routing area code), which can be used to identify subscriber station location for directing incoming voice and data traffic to appropriate paging transmitters and for directing emergency calls. The LAC and RAC can also be used to facilitate commercial activity related to providing multimedia content to a consumer via a location of the user's wireless device, e.g., UE $120_A$, subscriber station $120_B$. For example, when a wireless device that exploits macro coverage, e.g., macro cell 105, enters a coverage area associated with femto cell 125, the wireless device can attempt to attach to femto AP 130 through transmission and reception of attachment signaling via wireless link 135. In one aspect, the attachment signaling can include a Location Area Update (LAU) and/or a Routing Area Update (RAU). The LAU and/or RAU can be used to identify customer presence and trigger the FEMTO network to notify a consumer, e.g., via the wireless communication device, of information comprising services and/or content available for purchase. This notification can also be used to launch a UE browsing and/or purchasing application associated with a retail establishment and/or content available for purchase.

When an attachment attempt by the wireless device is successful, the wireless device can be allowed on (or attached to) femto cell 125, and incoming voice and data traffic are paged and routed to the user (subscriber) via femto AP 130. To facilitate voice routing, data routing, and control signaling, successful attachment can be recorded in a memory register, e.g., a Visitor Location Register (VLR), or substantially any data structure stored in a network memory device. In another aspect of the subject disclosure described below, the data structure can be used to store information related to multimedia content the user has downloaded and/or most often downloaded.

It should be noted that packet communication, e.g., voice traffic, data traffic, is typically paged/routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, femto AP 130 is typically connected to the backhaul network via a broadband modem (not shown). Through access point backhaul link 153, femto AP 130 can handle substantially any quality of service (QoS) for heterogeneous packetized traffic, e.g., various multiple packet flows.

Figure 2:
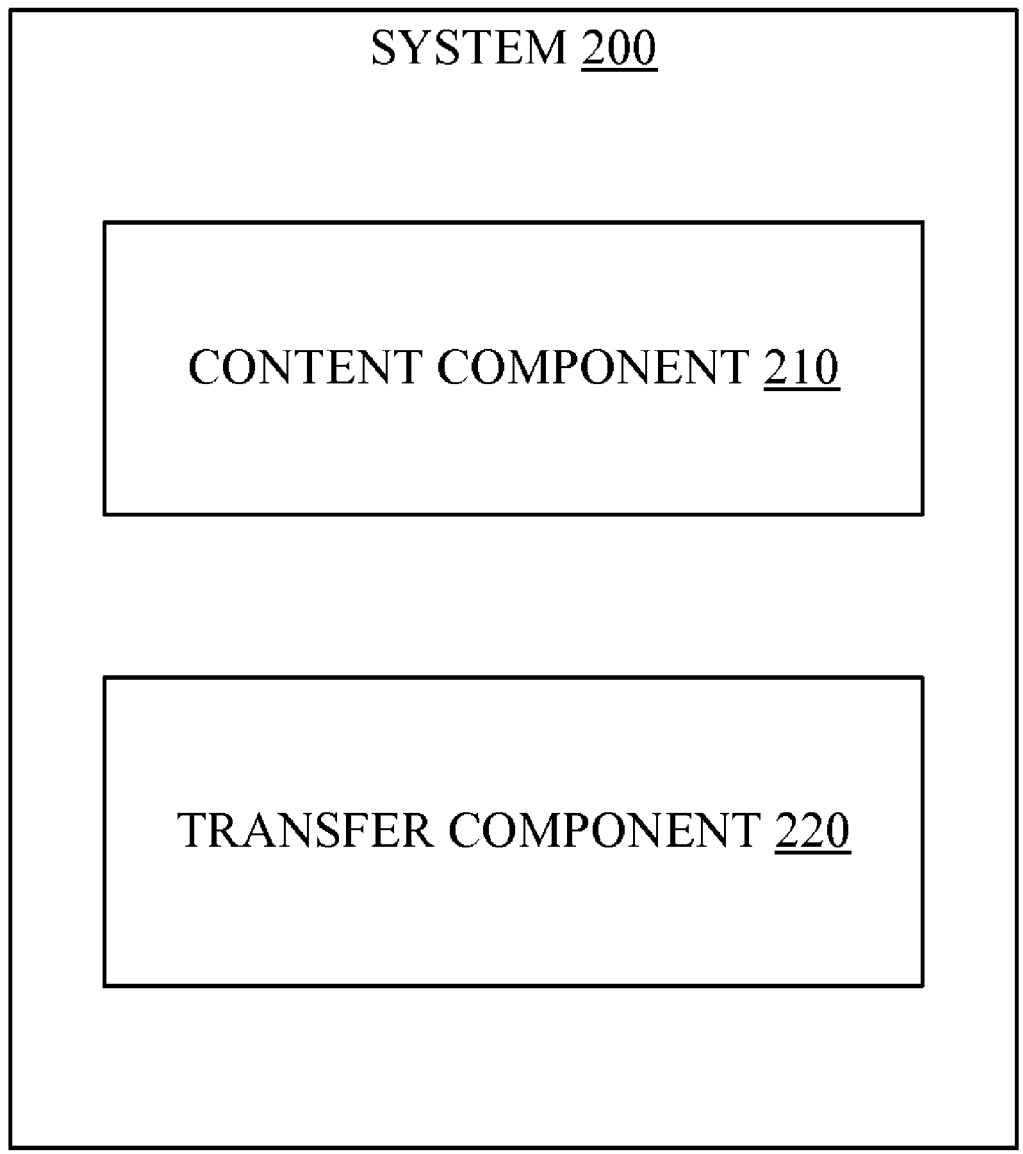
FIG. 2 illustrates a demonstrative system for effectively selling multimedia content to consumers in a retail establishment, in accordance with an embodiment.

The methods and apparatus of the subject disclosure reduce business costs and improve customer satisfaction by enabling customers to download multimedia content onto portable devices and/or storage media via a femto based kiosk. FIG. 2 illustrates a demonstrative system 200 for effectively selling multimedia content to consumers within retail establishments, in accordance with an embodiment. System 200 and the systems described below comprise femto AP 130 (see above) to facilitate femto based communication and data transfer in accordance with the disclosed subject matter.

Further, system 200 and the systems and processes explained below may constitute machine-executable instructions embodied within a machine, e.g., computer, readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

As illustrated by FIG. 2, system 200 can include content component 210 and transfer component 220. Content component 210 can receive multimedia content from a base station, e.g., base station 110, coupled to a core network, e.g., service provider network 155. The multimedia content can comprise digitized audio and/or visual data related to, e.g., a movie, a video game, music, etc. Further, the digitized audio and/or visual data can be received from the core network via the base station utilizing various cellular wireless technologies, e.g., Third Generation Partnership Project (3GPP) Universal Mobile Telecommunication System (UMTS), Global System for Mobile Communication (GSM), etc.

The multimedia content can be transferred from the core network to the base station via one or more backhaul links, e.g., backhaul link(s) 151 or access point backhaul link(s) 153, that can be wired, e.g., optical fiber backbone, twisted-pair line, T1/E1 phone line, synchronous or asynchronous digital subscriber line (DSL), asymmetric DSL (ADSL), coaxial cable, etc.; or wireless, e.g., based on a wireless telecommunication or radio technology described above. Transfer component 220 can wirelessly transfer the received multimedia content to a mobile device, e.g., UE $120_A$, subscriber station $120_B$, by utilizing a femto based wireless protocol based on, at least in part, a sale of the received multimedia content. In this way, the various methods and apparatus of the disclosed subject matter increase customer satisfaction while reducing business costs.

It should be appreciated that the mobile device can be any wireless mobile device, e.g., cellular phone, personal data assistant (PDA), handheld device, computing device connected to a wireless modem, processing device connected to a wireless modem, etc., that can wirelessly communicate with the femto based kiosk, e.g., via femto AP 130. Also, it should be appreciated that the sale of multimedia content can be initiated by a consumer, or a business associated with the femto based kiosk. For example, the business can offer incentives, coupons, etc. to the consumer via the mobile device to initiate a sale of multimedia content (see below).

Figure 3:
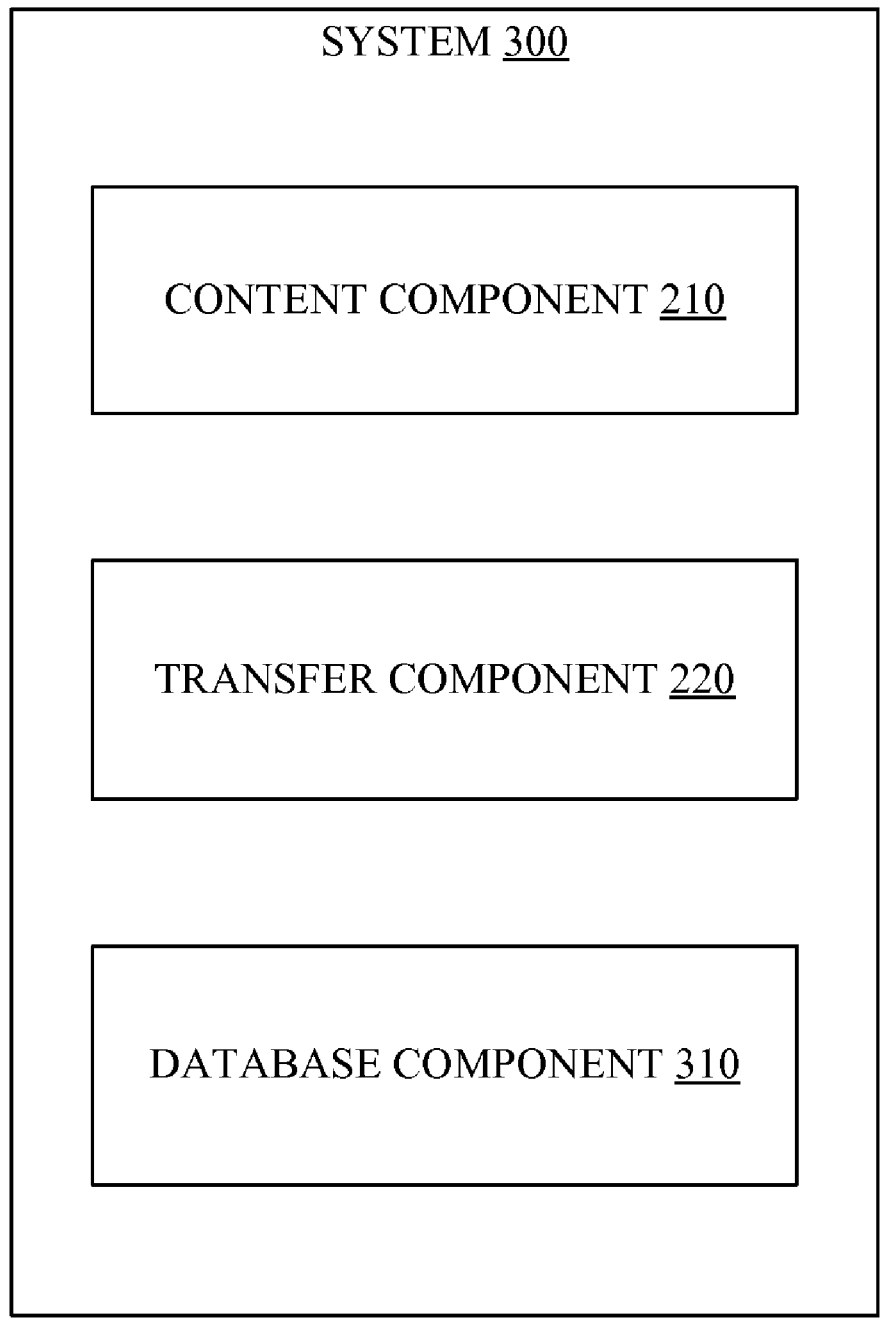
FIG. 3 illustrates a demonstrative system that includes a database component for effectively selling multimedia content to consumers in a retail establishment, in accordance with an embodiment.

FIG. 3 illustrates a demonstrative system 300 that includes a database component 310 for effectively selling multimedia content to consumers in a retail establishment, in accordance with an embodiment. Database component 310 can store the received multimedia content in a data store (not shown), which can comprise any removable/non-removable storage medium. Further, transfer component 220 can wirelessly transfer the stored multimedia content to a mobile device using a femto based wireless protocol based on the sale of the multimedia content.

Figure 4:
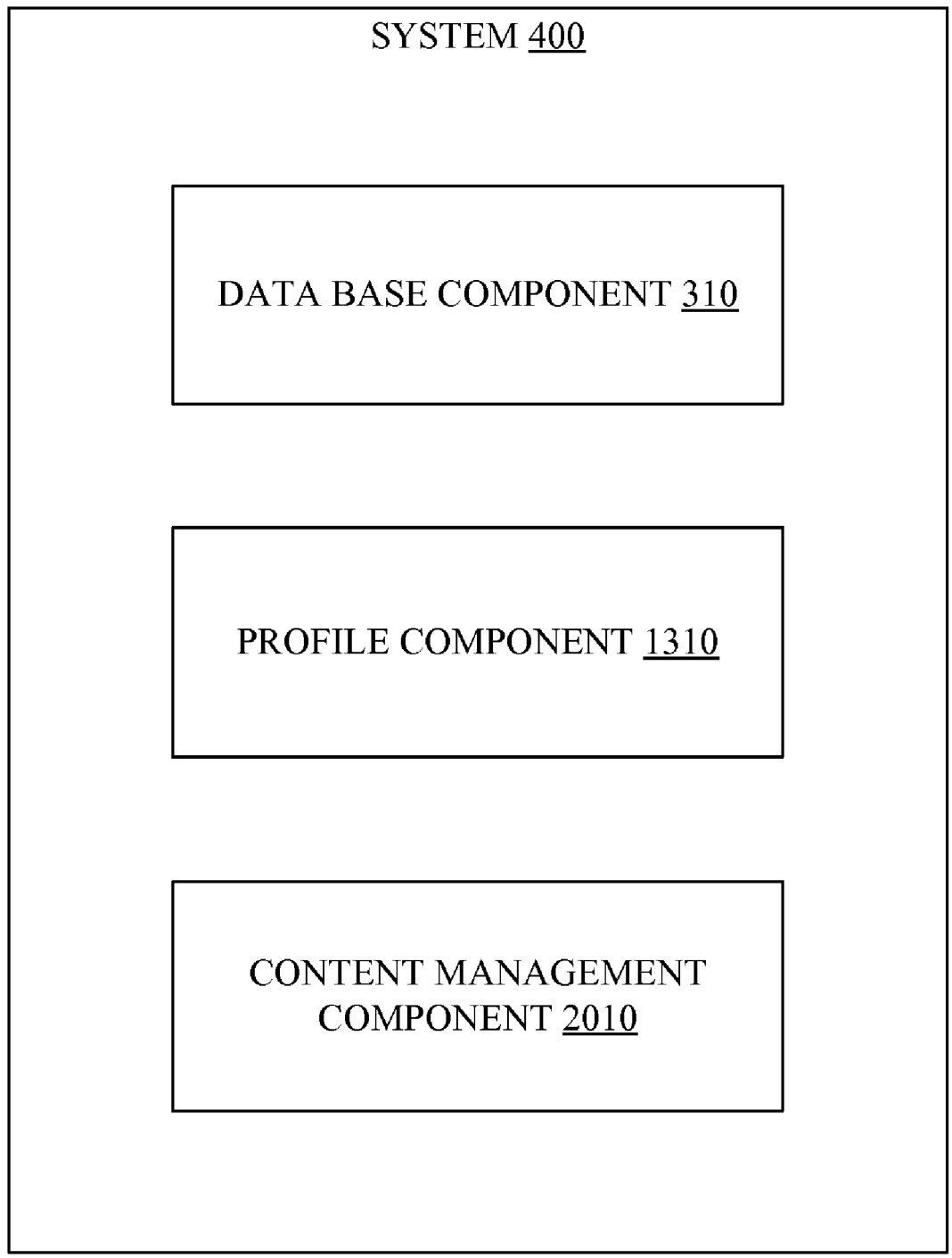
FIG. 4 illustrates a demonstrative system that proactively stores, removes, overwrites, and/or updates multimedia content in a data store, in accordance with an embodiment.

In one embodiment (e.g., system 400 illustrated by FIG. 4), database component 310, via profile component 1310 (see below) and content management component 2010 (see below), can proactively store, remove, overwrite, and/or update multimedia content in the data store. For example, sequel(s) and/or prequel(s) of popular movies, e.g., movies most transferred and/or sold from a femto based kiosk, can be proactively stored in the data store of the femto based kiosk for "ready" wireless transfer to at least one mobile device to anticipate purchase(s) of the sequel(s) and/or prequel(s). In another example, movies of a similar genre of movies transferred and/or sold from the femto based kiosk can be proactively stored in the data store to anticipate purchase(s) of such movies, e.g., action movies; horror movies; or movies appropriate for sale during a season or holiday. In yet another example, music associated with an artist, performer, group, etc. can be proactively stored in the data store to anticipate purchase(s) of the music.

Figure 5:
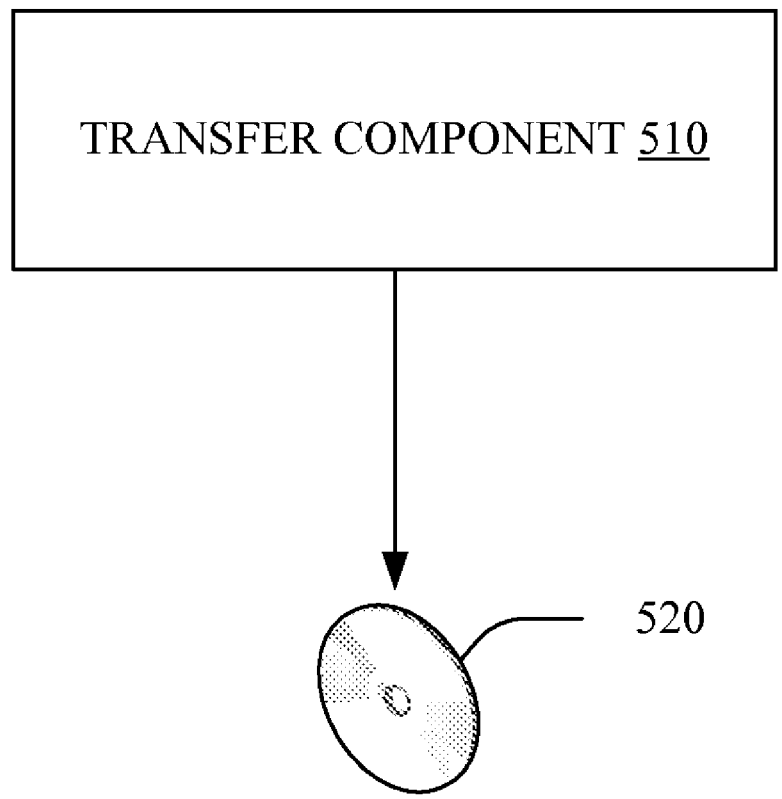
FIG. 5 illustrates a demonstrative system that records purchased multimedia content in a removable data storage device, in accordance with an embodiment.

Now referring to FIG. 5, a demonstrative system 500 that records purchased multimedia content in a removable data storage device 520 is illustrated, in accordance with an embodiment. Transfer component 510 can record the received multimedia content (regardless of whether it is stored in data store 310) in removable data storage device 520 based on, at least in part, the sale of the received multimedia content. For example, when the sale of the received multimedia content concerns recording the multimedia content on a memory stick, universal serial bus (USB) memory device, CD, DVD, BD, or other removable storage device, transfer component 510 can record the multimedia content on the removable storage device. In another embodiment, a customer can purchase at least one of a wireless transfer to the customer's femto equipped mobile device or a recording of the multimedia content stored on a removable storage device. In yet another embodiment, a billing component (see below) can determine appropriate pricing associate with different transfer options.

Figure 6:
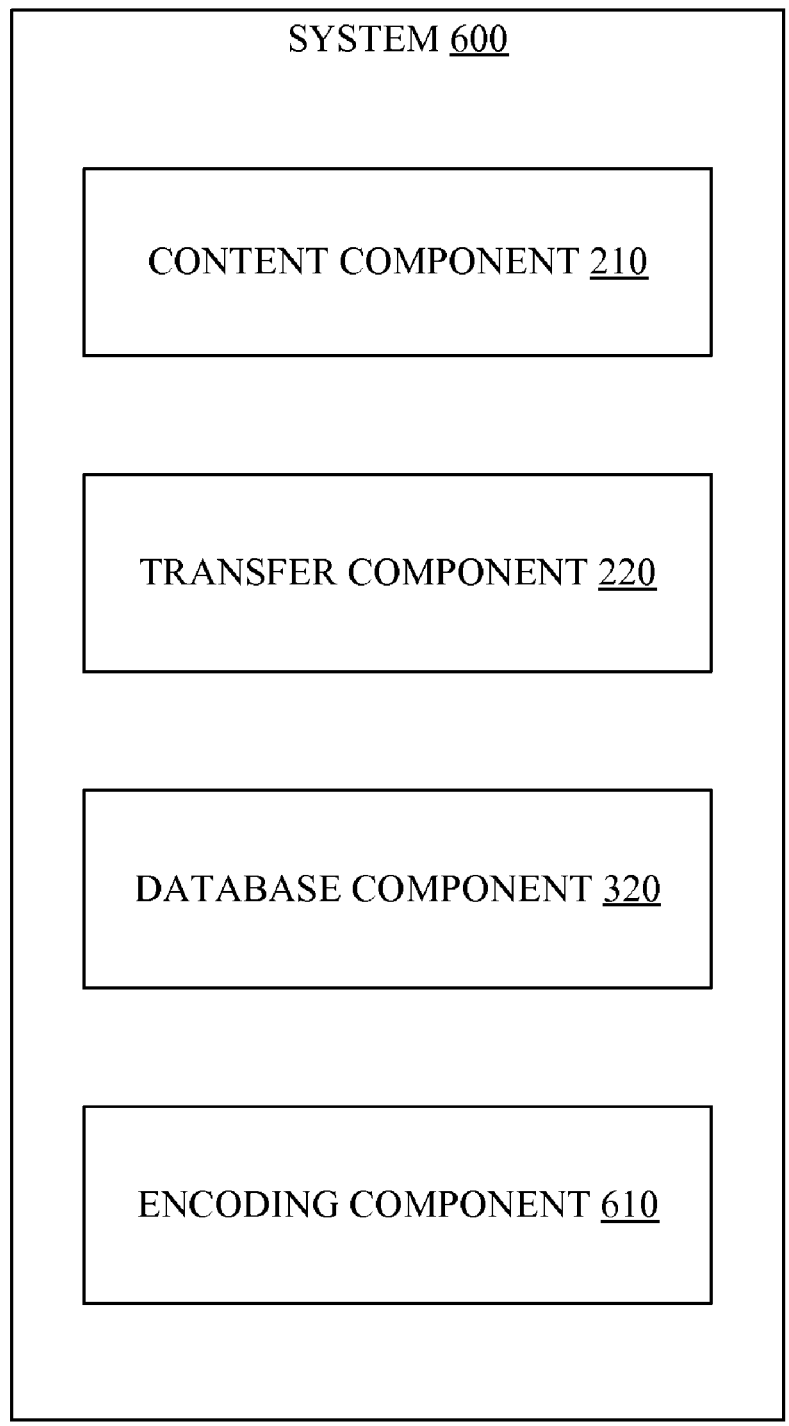
FIG. 6 illustrates a demonstrative system that includes an encoding component for encoding multimedia content based on an optimal encoding scheme, in accordance with an embodiment.

FIG. 6 illustrates a demonstrative system 600 that includes an encoding component 610 for encoding multimedia content based on an optimal encoding scheme, in accordance with an embodiment. Multimedia devices often require a video and/or audio encoding scheme applied to digitized multimedia data so that component(s) (e.g., audio and/or video coder/decoder (codec)) of each device can generate audio and/or video in an optimal manner, e.g., optimized for a video resolution associated with a display of a device. To this end, encoding component 610 can determine an optimal encoding scheme for the mobile device based on information received from the core network and/or the mobile device (e.g., UE 120$_A$, subscriber station 120$_B$).

For example, component(s), e.g., macro network platform 108, femto network platform 109, within the core network can determine an optimal encoding scheme for the mobile device based on an identification of the mobile device. In one embodiment, the component(s) can determine an optimal encoding scheme for the mobile device based on a UE hardware indicator, e.g., International Mobile Subscriber Identity (IMSI), International Mobile Equipment Identity (IMEI), or Type Approval Code (TAC) range, associated with the mobile device, e.g., stored in a database of the core network or communicated by the mobile device. By cross referencing the IMSI, IMEI, or TAC of the mobile device with subscription information contained in a database of the core network, the core network can determine an optimal bit rate and/or form for encoding the data. Returning to FIG. 6, encoding component 610 can encode received multimedia content based on, at least in part, a determined encoding scheme. As such, transfer component 220 can wirelessly transfer the encoded multimedia content to the mobile device utilizing the femto based wireless protocol based on, at least in part, the sale of the received multimedia content.

Figure 7:
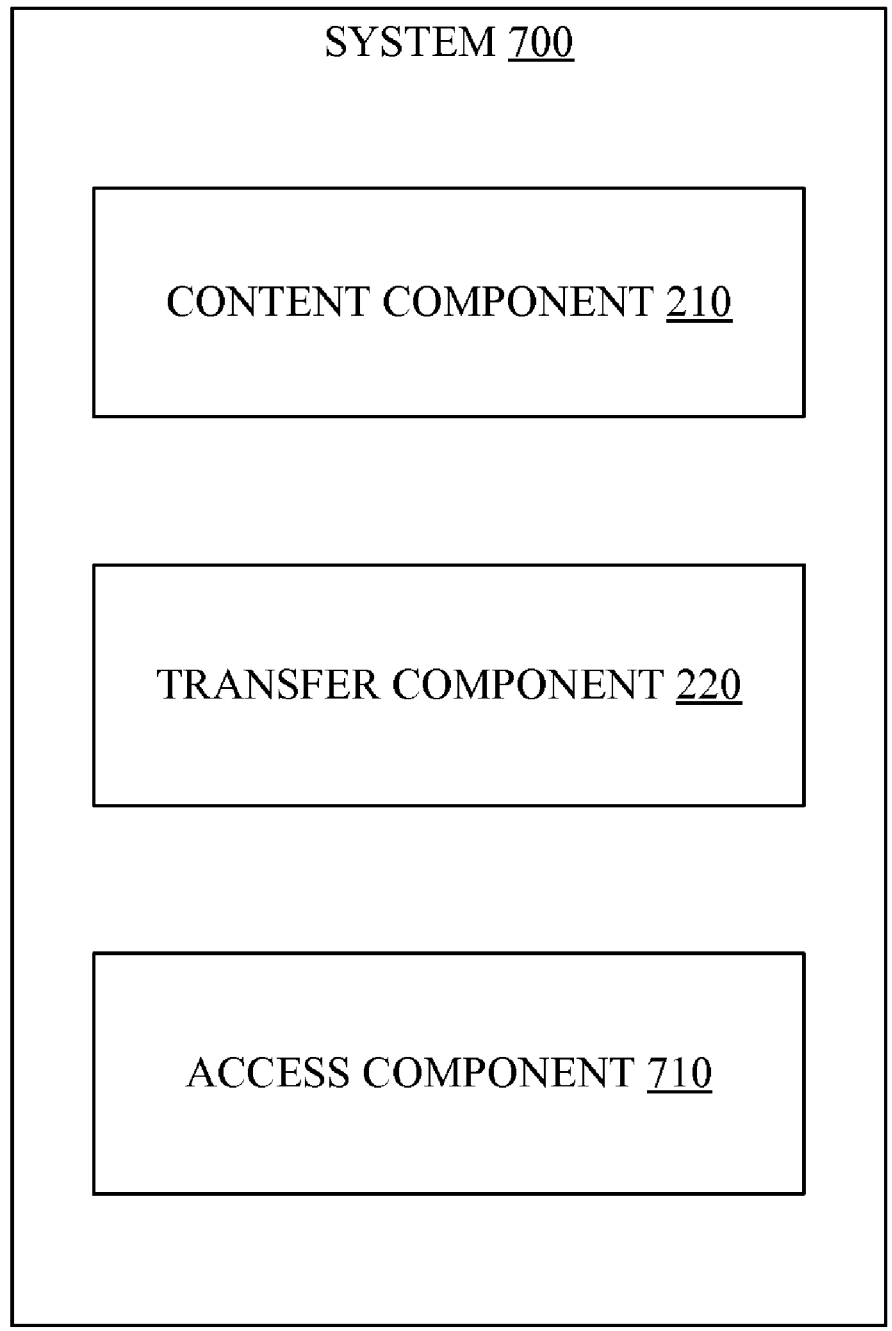
FIG. 7 illustrates a demonstrative system that includes an access component for effectively selling multimedia content to consumers in a retail establishment, in accordance with an embodiment.

FIG. 7 illustrates a demonstrative system 700 that includes an access component 710 for effectively selling multimedia content to consumers in a retail establishment, in accordance with an embodiment. Access component 710 can control one or more of the following based on information associated with the mobile device: (1) permission to purchase the received multimedia content; (2) permission to access the core network via the femto based wireless protocol; or (3) a fee associated with the sale. In one embodiment, access component 710 can permit purchase of multimedia content. In another embodiment, access component 710 can permit access to the core network via the femto based wireless protocol, e.g., for placing and/or receiving calls/messages/data via the core network the user, based on a femto access control list (not shown).

The femto access control list can be stored in a database located within service provider network 155, or in any location within the network, e.g., system 100. For example, when a consumer associated with a mobile device registers with access component 710, e.g., by paying a fee to a service provider, access component 710 can enable the consumer to purchase multimedia content via system 700. In another example, access component 710 can enable the consumer to place and/or receive calls via the core network when the consumer is registered with access component 710, e.g., when the IMSI associated with the mobile device is added and/or updated in the access control list.

Figure 8:
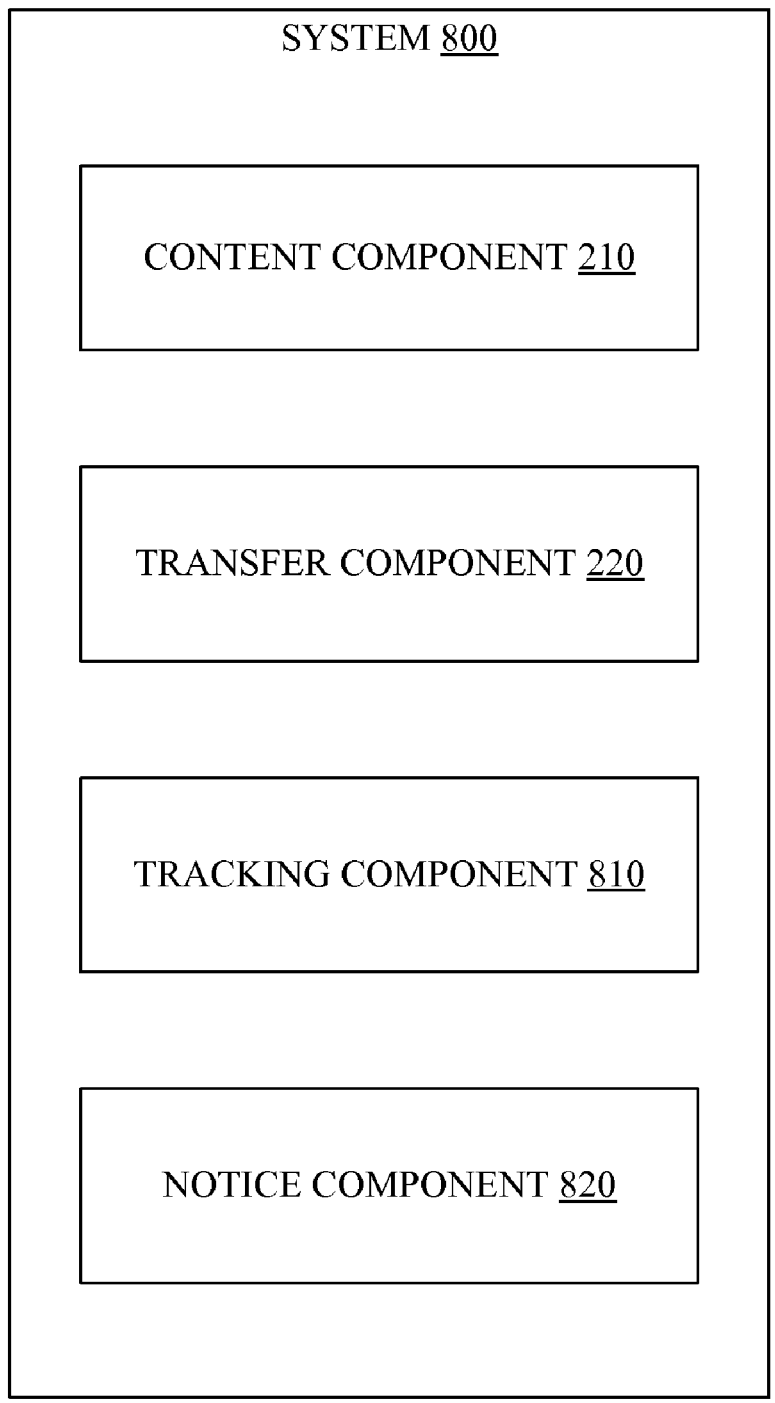
FIG. 8 illustrates a demonstrative system that includes a tracking component and notice component for effectively selling multimedia content to consumers in a retail establishment, in accordance with an embodiment.

FIG. 8 illustrates a demonstrative system 800 that includes a tracking component 810 and notice component 820 for effectively selling multimedia content to consumers in a retail establishment, in accordance with an embodiment. Tracking component 810 can receive attachment input from one or more mobile devices via the femto based wireless protocol. Further, tracking component 810 can track the location of the one or more mobile devices based on the attachment input(s). Moreover, notice component 820 can transmit information associated with multimedia content and/or services to the one or more mobile devices based on a tracked location of the one or more mobile devices. In one embodiment, a mobile device can attempt to attach to system 800 by transmitting and receiving attachment signaling via the femto based wireless protocol, e.g., via femto AP 130 utilizing wireless link 135. The attachment signaling can include a Location Area Update (LAU) and/or a Routing Area Update (RAU) that can be used to notify a customer, e.g., via the mobile device, of services and/or content available for purchase at system 800.

Figure 9:
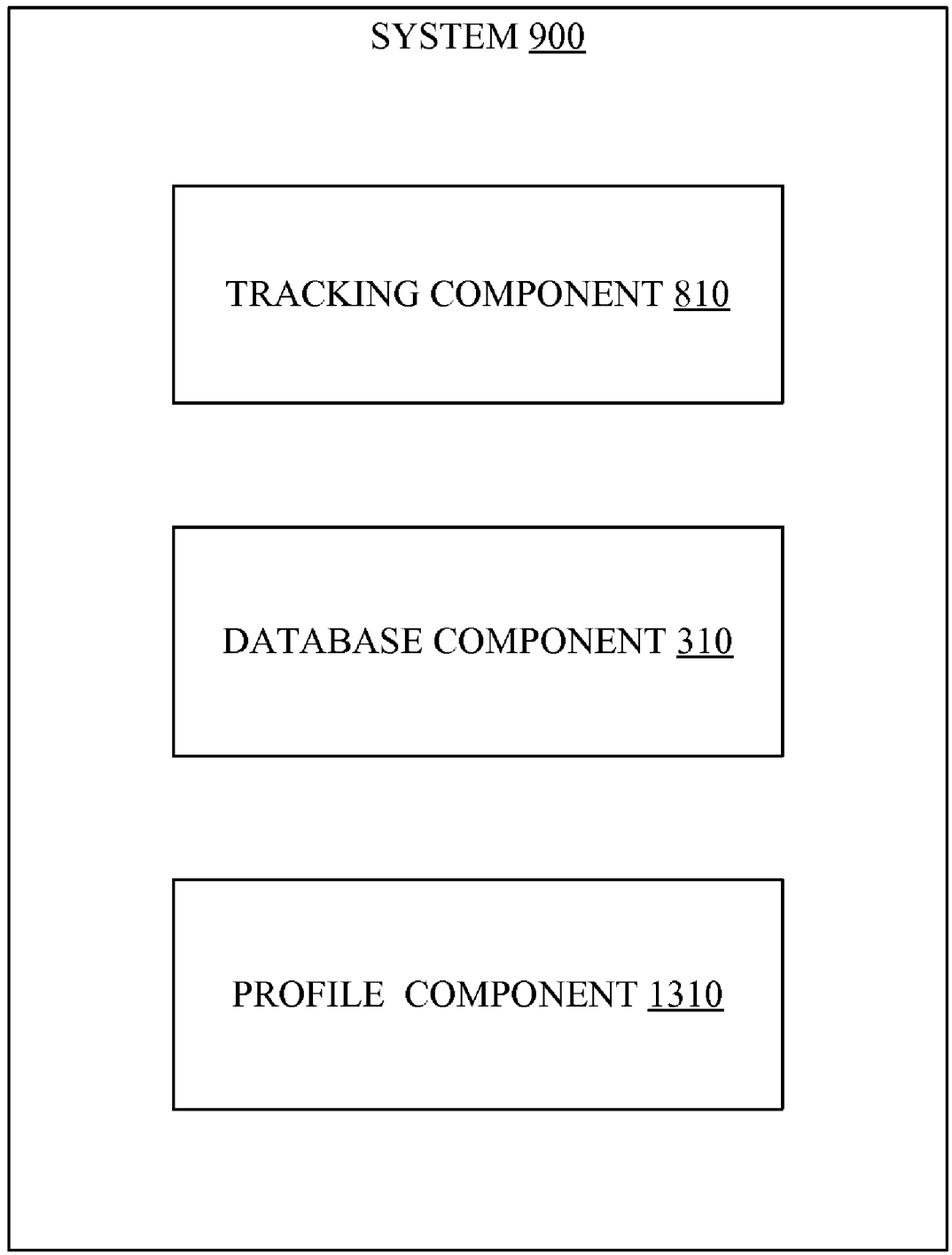
FIG. 9 illustrates a demonstrative system that stores and/or retrieves information related to multimedia content and/or services, in accordance with an embodiment.

For example, notice component 820 can send a "welcome message" to the customer, e.g., via a text based short message service (SMS) protocol, and/or notify the customer by any audio and/or visual means capable of being output by the mobile device, e.g., ring tone, vibrate mode, etc. about products and/or services for sale, e.g., at system 800, at other locations within a business establishment where system 800 is located, at other locations. The welcome message can also be used to automatically launch a UE browsing and/or purchasing application on the mobile device. In another embodiment (e.g., system 900 illustrated by FIG. 9), tracking component 810 can store and/or retrieve information related to multimedia content and/or services a customer purchased, and/or information related to a type of multimedia content and/or services most often purchased by the customer, e.g., via database component 310 (see above) and/or profile component 1310 (described below). Such information can be stored in or retrieved from a database located within service provider network 155, or in any location within the network, e.g., system 100.

Figure 10:
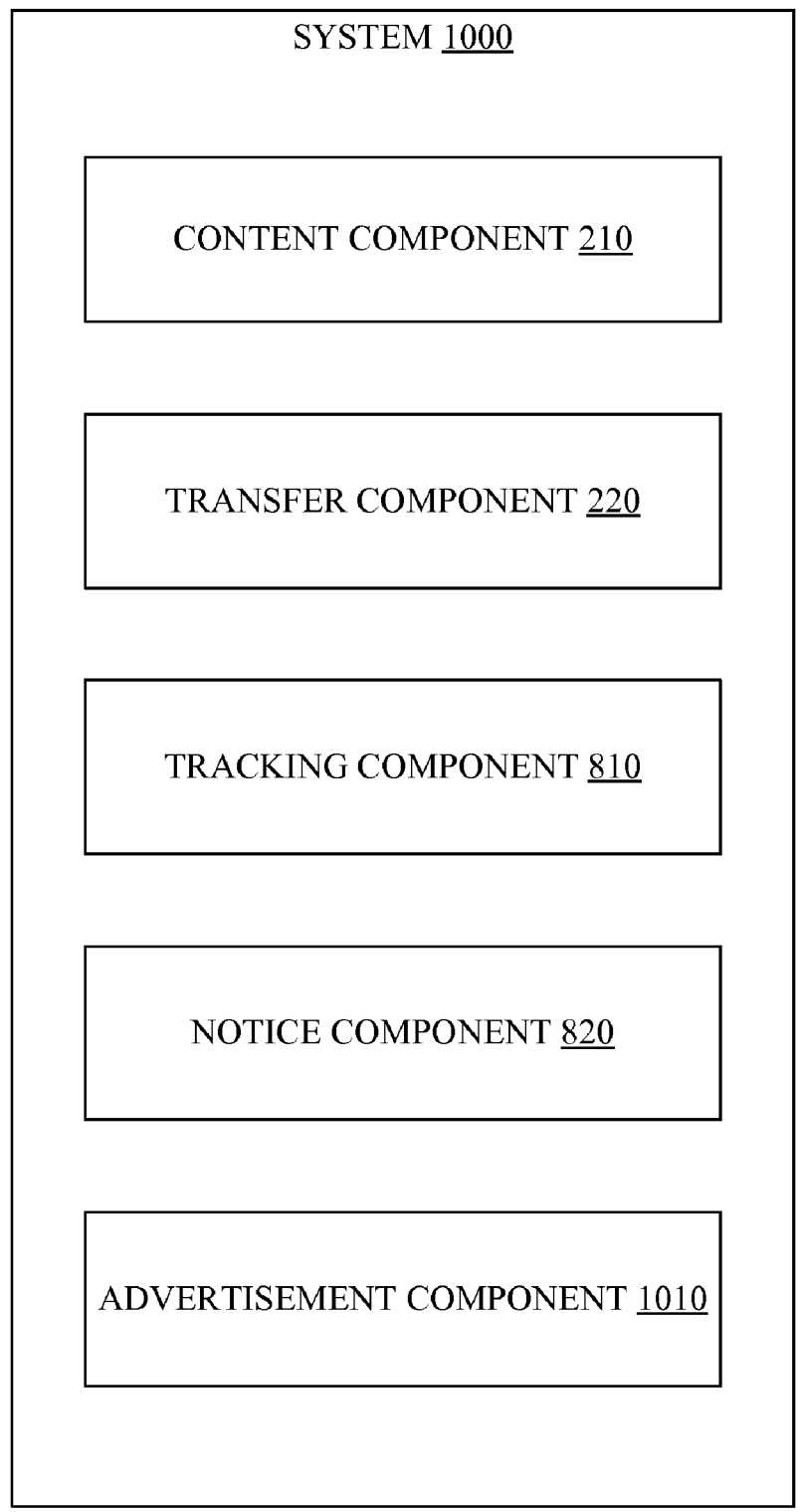
FIG. 10 illustrates a demonstrative system that includes an advertisement component for effectively selling multimedia content to consumers in a retail establishment, in accordance with an embodiment.
Figure 11:
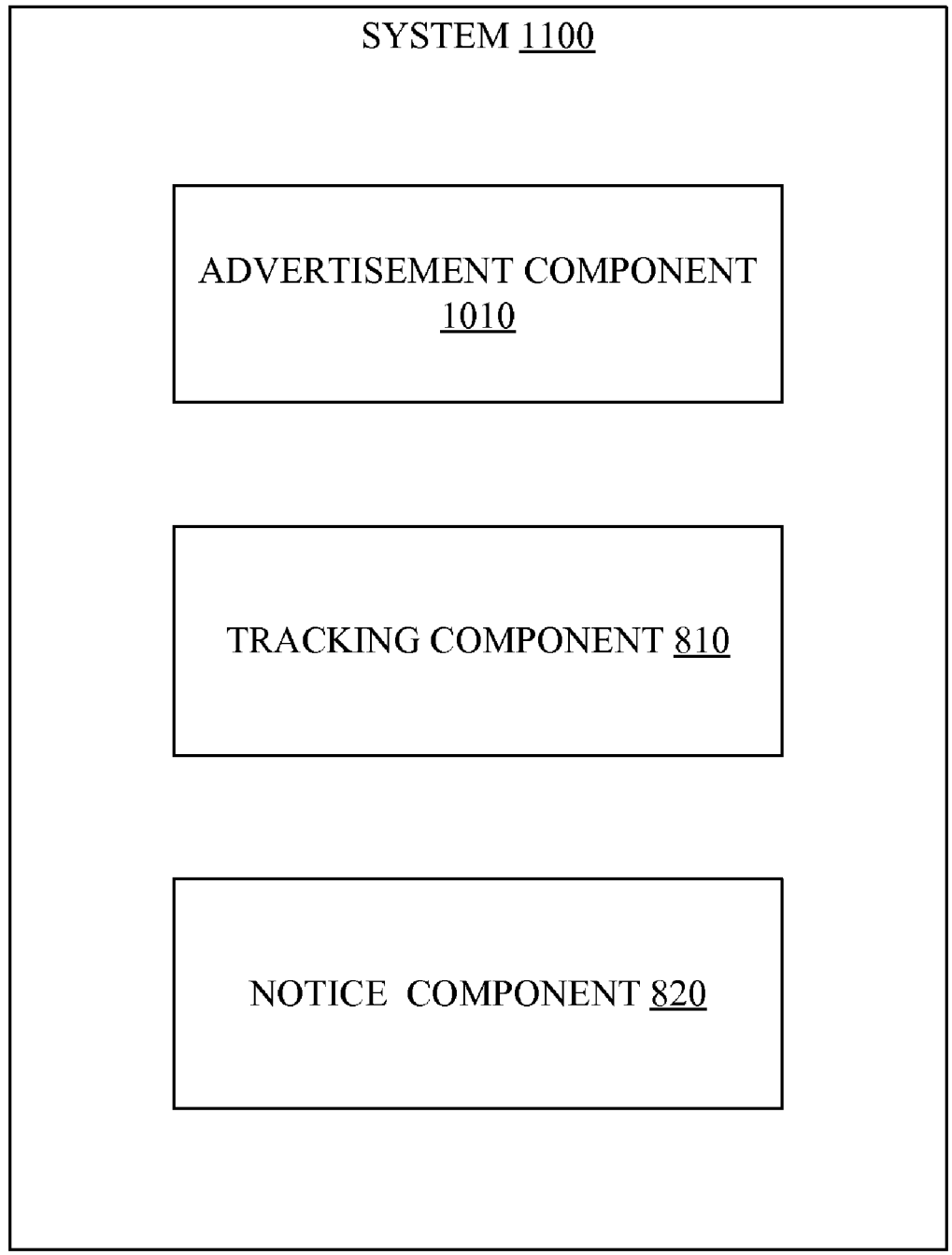
FIG. 11 illustrates a demonstrative system that obtains information related to the location of the mobile device, in accordance with an embodiment.

FIG. 10 illustrates a demonstrative system 1000 that includes an advertisement component 1010 for effectively selling multimedia content to consumers in a retail establishment, in accordance with an embodiment. Advertisement component 1010 can transmit information to a mobile device comprising incentives for purchasing multimedia content and/or services. Further, advertisement component 1010 can initiate a browsing and/or purchasing application, e.g., via an artificial intelligence component (not shown), on the mobile device. In one embodiment (e.g., system 1100 illustrated by FIG. 11), advertisement component 1010 can interface with tracking component 810 to obtain information related to the location of the mobile device. Further, advertisement component 1010 can interface with tracking component 810 and notice component 820 to direct advertisements to a customer using the mobile device.

For example, advertisement component can direct advertisements to the customer based on a location of the customer, e.g., adjust the content of the advertisements as a function of products the customer is near within a business establishment. In another example (e.g., system 1200 illustrated by FIG. 12), advertisement component 1010 can direct advertisements to the customer via notice component 820 based on the information stored by tracking component 810 (via profile component 1310 (described below)), e.g., information associated with services and/or multimedia content the customer purchased and/or transferred; information associated with services and/or multimedia content most often purchased and/or transferred by the customer.

Figure 13:
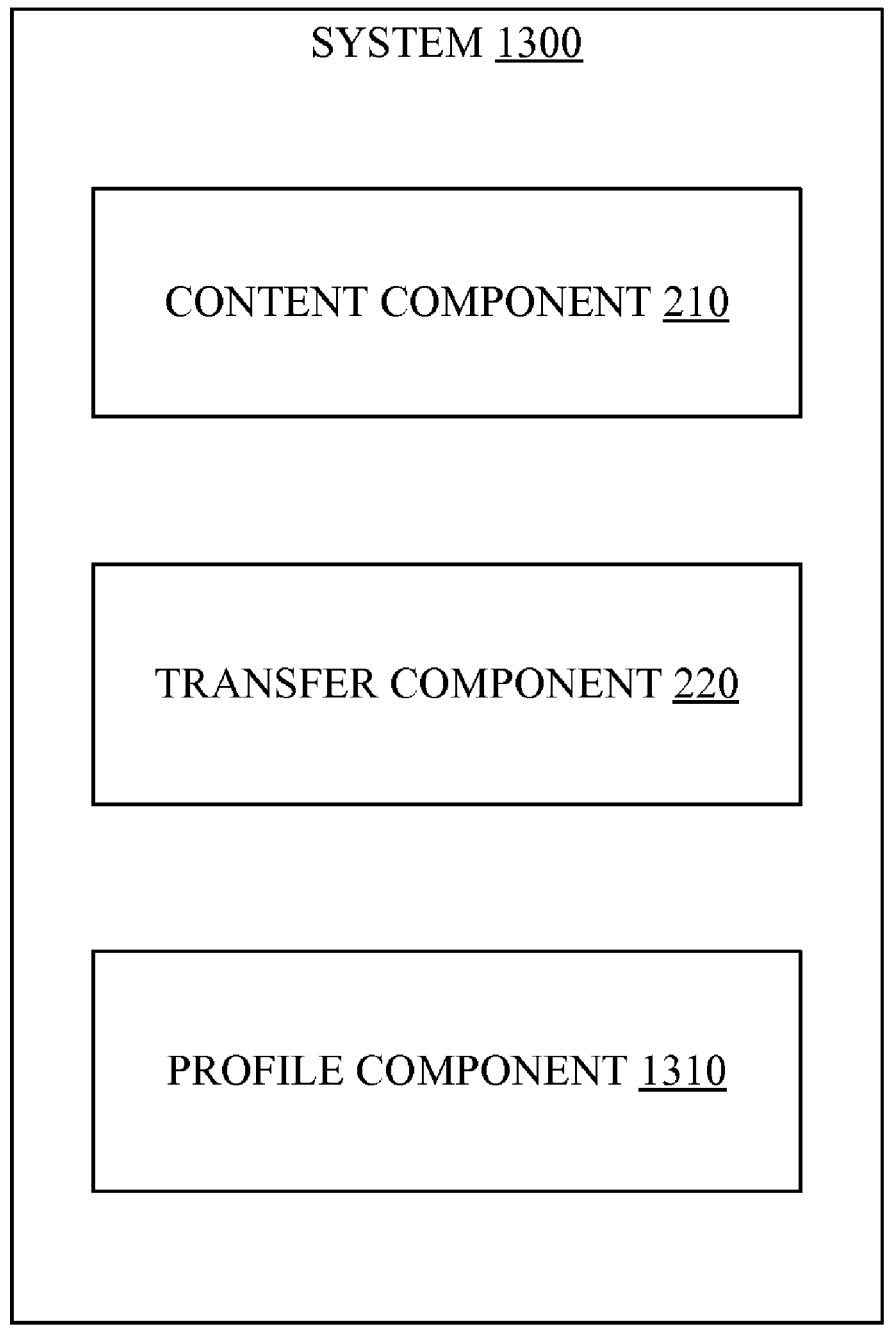
FIG. 13 illustrates a demonstrative system that includes a profile component for effectively selling multimedia content to consumers in a retail establishment, in accordance with an embodiment.

FIG. 13 illustrates a demonstrative system 1300 that includes a profile component 1310 for effectively selling multimedia content to consumers in a retail establishment, in accordance with an embodiment. Profile component 1310 can create and/or update a profile associated with multimedia content that is: (1) received at a femto based kiosk; (2) stored in a data store of the femto based kiosk; (3) wirelessly transferred to one or more mobile devices via the femto based kiosk; and/or (4) transferred to one or more removable data storage devices via the femto based kiosk. In one embodiment, profile component 1310 can monitor a number of times the stored multimedia content is wirelessly transferred to one or more mobile devices or recorded in one or more removable data storage devices. Further, profile component 1310 can create and/or update the profile based on the monitored number of times the stored multimedia content is wirelessly transferred to the one or more mobile devices or recorded in the one or more removable data storage devices.

In another embodiment, profile component 1310 can create and/or update the profile based on multimedia content most and/or least transferred to the one or more mobile devices or recorded in the one or more removable data storage devices. In yet another embodiment, profile component 1310 can create and/or update the profile based on a genre associated with the multimedia content, e.g., movies, music, games, etc. transferred from a femto based kiosk.

Figure 15:
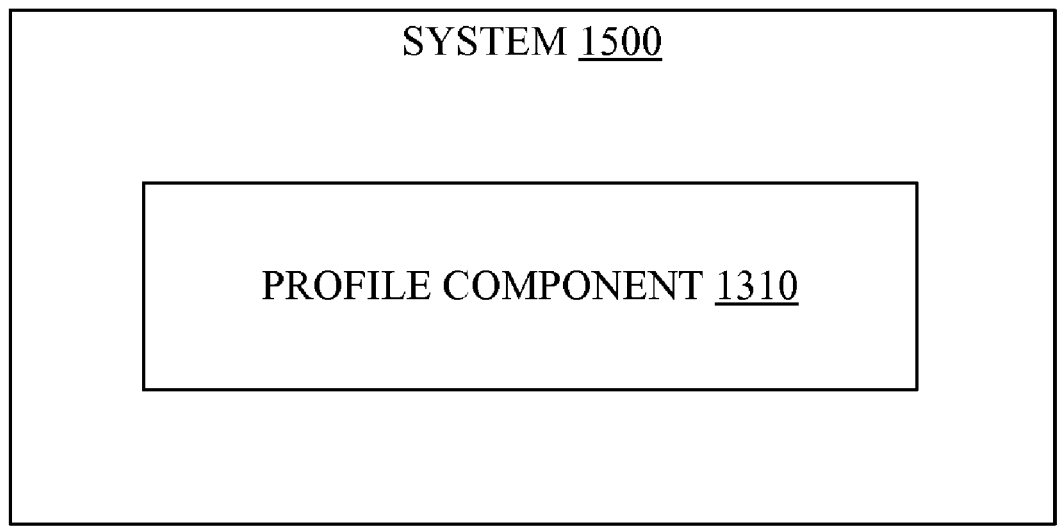
FIG. 15 illustrates a demonstrative system that aggregates profiles associated with femto based kiosks located within a business establishment, in accordance with an embodiment.

In one embodiment, profile component 1310 can create and/or update a profile associated with multimedia content transferred to a mobile device, e.g., to characterize content preferred by a user of the mobile device. In another embodiment (e.g., system 1400 illustrated by FIG. 14), this information can be used, e.g., by advertisement component 810, to direct marketing and/or advertisements to the user via, e.g., the mobile device, email, SMS protocol, etc. In another embodiment (e.g., system 1500 illustrated by FIG. 15), profile component 1310 can aggregate profiles associated with femto based kiosks located within a business establishment to determine metrics associated with femto based kiosk sales made within the business establishment.

Figure 16:
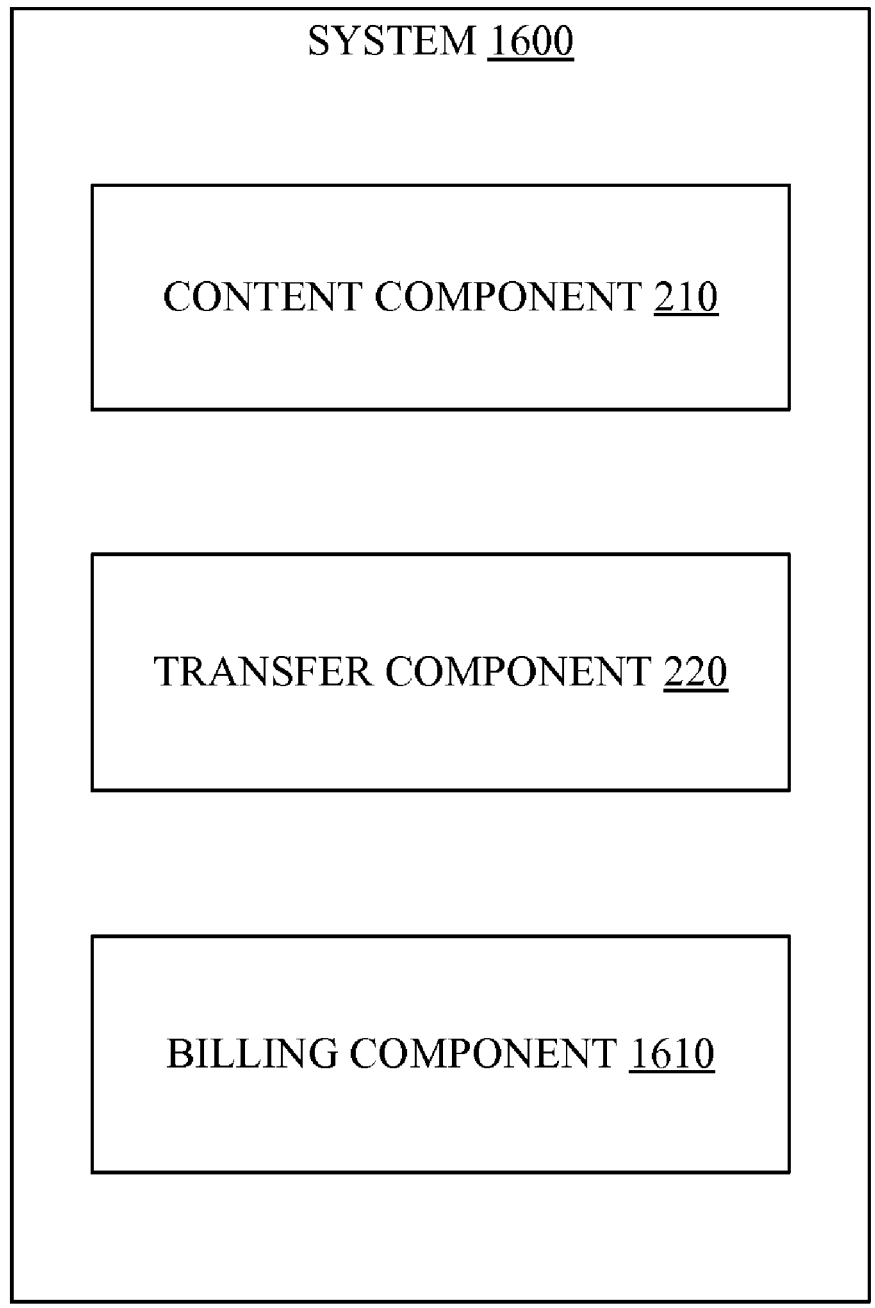
FIG. 16 illustrates a demonstrative system that includes a billing component for effectively selling multimedia content to consumers in a retail establishment, in accordance with an embodiment.

FIG. 16 illustrates a demonstrative system 1600 that includes a billing component 1610 for effectively selling multimedia content to consumers in a retail establishment, in accordance with an embodiment. Billing component 1610 can transmit information associated with the sale of the received multimedia content to an entity associated with the core network, e.g., a service provider of service provider network 155.

In one embodiment, such information can include a billing rate based on a transfer of multimedia content. In another embodiment, such information can include a billing rate associated with an amount of time used to wirelessly transfer multimedia content to the mobile device. In yet another embodiment (e.g., system 1700 illustrated by FIG. 17), billing component 1610 can adjust a billing rate associated with the sale of multimedia content based on input received via profile component 1310. For example, billing component 1610 can award discounts for purchasing less popular content or for purchasing content transferred to a removable storage device.

Figure 18:
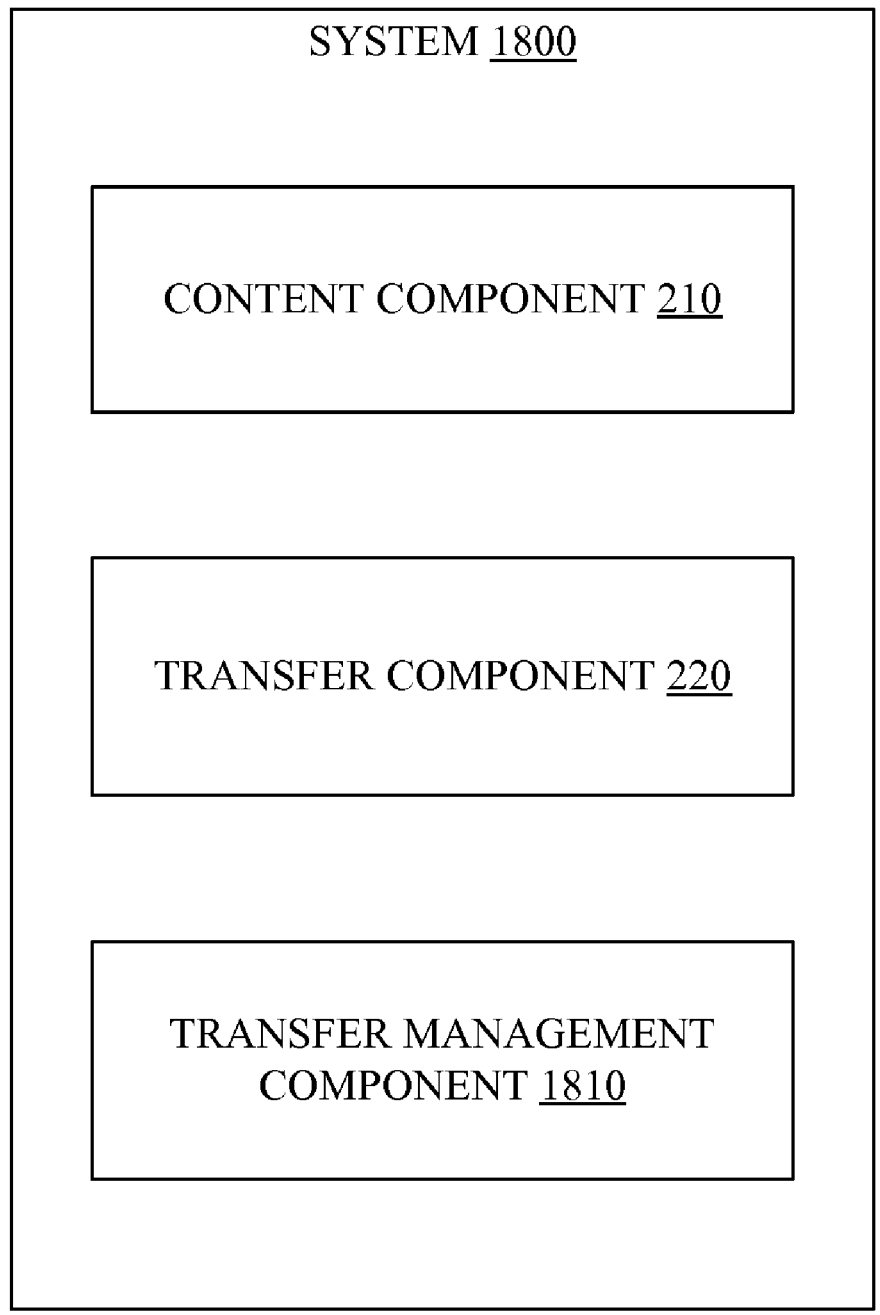
FIG. 18 illustrates a demonstrative system that includes a transfer management component for effectively selling multimedia content to consumers in a retail establishment, in accordance with an embodiment.

FIG. 18 illustrates a demonstrative system 1800 that includes a transfer management component 1810 for effectively selling multimedia content to consumers in a retail establishment, in accordance with an embodiment. Transfer management component 1810 can report a status of the wireless transfer, and based on the reported status: (1) offer an incentive to complete the wireless transfer via the mobile device; (2) forward an incomplete portion of the wireless transfer to another device and/or a macro base station for later retrieval; (3) halt the wireless transfer after a portion of the multimedia content is wirelessly transferred, and wirelessly transfer remaining portions of the multimedia content when the wireless transfer is resumed; and/or (4) terminates the wireless transfer before the multimedia content is successfully transferred to the mobile device, e.g., based on reduced signaling conditions, interrupted transfer, etc. For example, an interrupted and/or incomplete transfer can be completed from another macro base station, e.g., a macro base station that is not capacity limited. In another example, an interrupted and/or incomplete transfer can be completed from a computing device, e.g., a personal computer with high-speed wired data connection that is located at a consumer's home.

Figure 19:
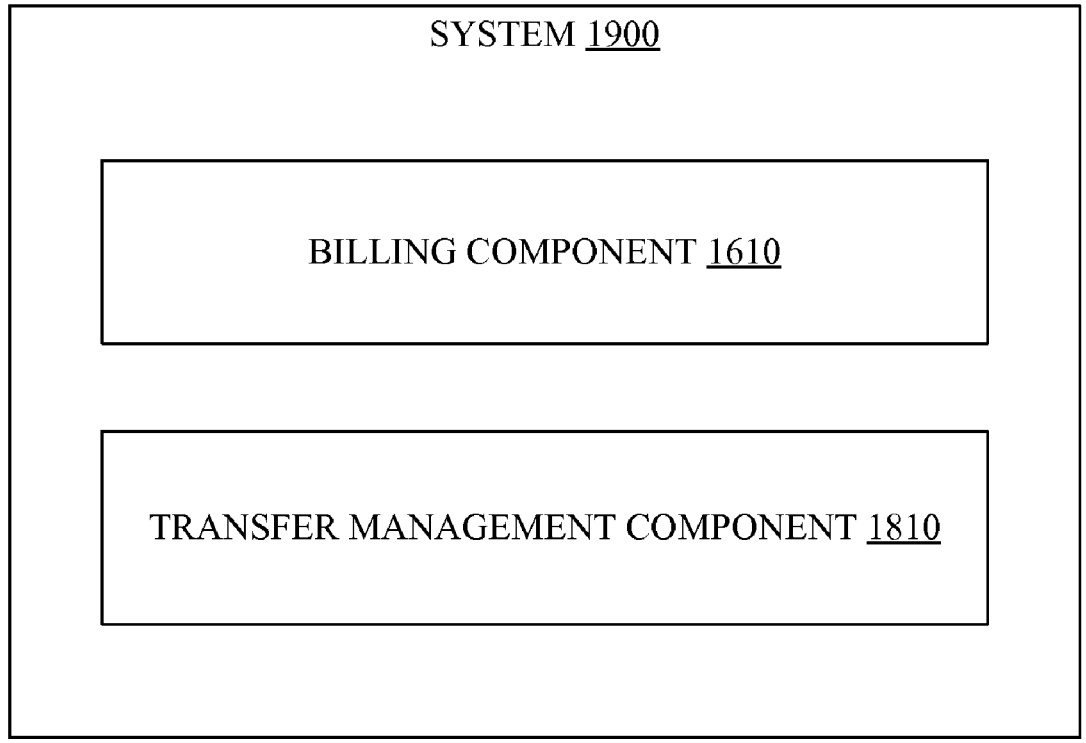
FIG. 19 illustrates a demonstrative system that removes charges associated with wireless transfers, in accordance with an embodiment.

In one embodiment, transfer management component 1810 can display a status, e.g., progress bar, percent complete, duration, etc. of the wireless transfer on a graphical user interface of the mobile device, e.g., display screen, liquid crystal display (LCD), light emitting diode (LED) display, monitor, etc. In another embodiment (e.g., system 1900 illustrated by FIG. 19), billing component 1610 can interface with transfer management component 1810, e.g., by removing charges associated with wireless transfers that were terminated by transfer management component 1810.

Figure 20:
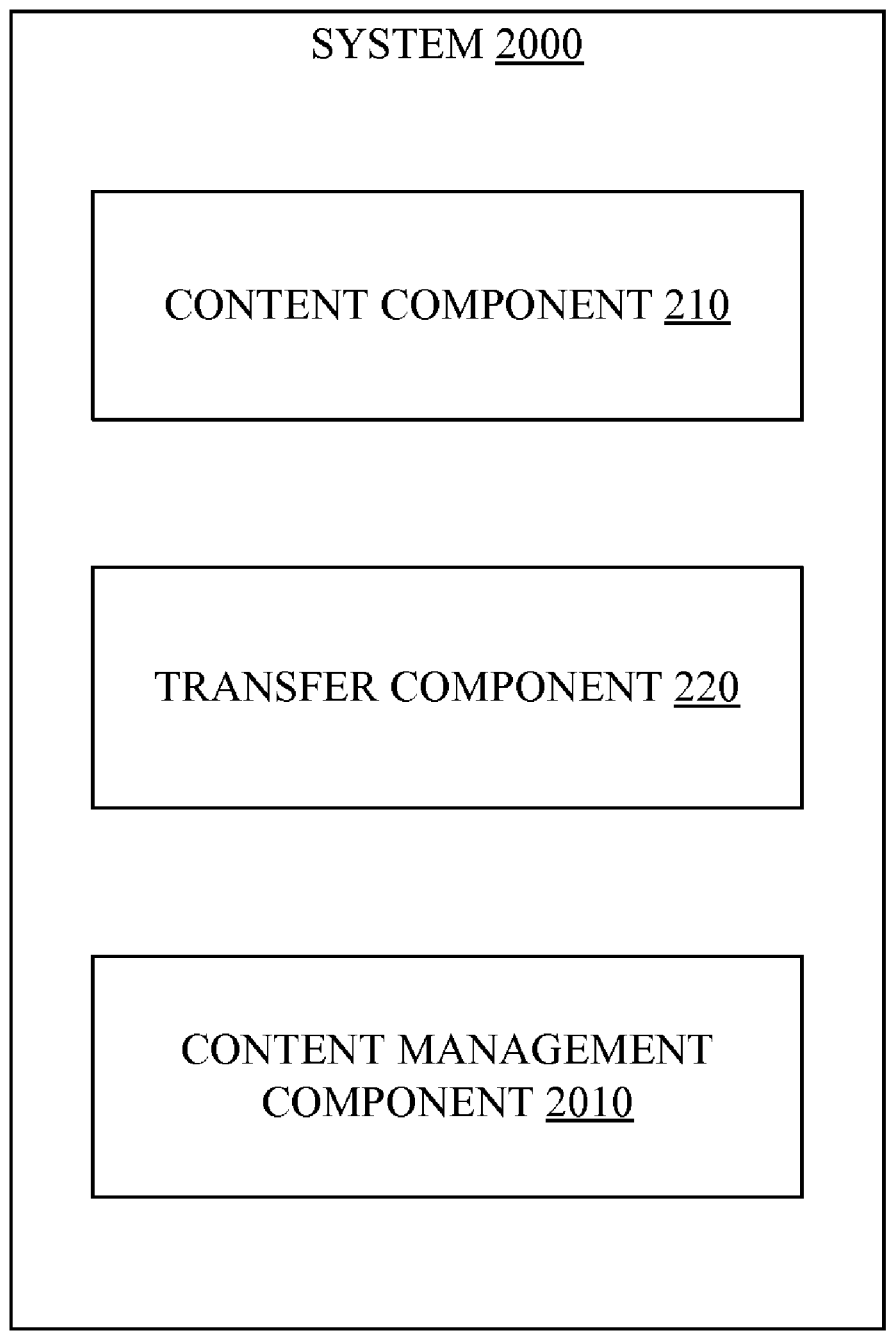
FIG. 20 illustrates a demonstrative system that includes a content management component for effectively selling multimedia content to consumers in a retail establishment, in accordance with an embodiment.
Figure 21:
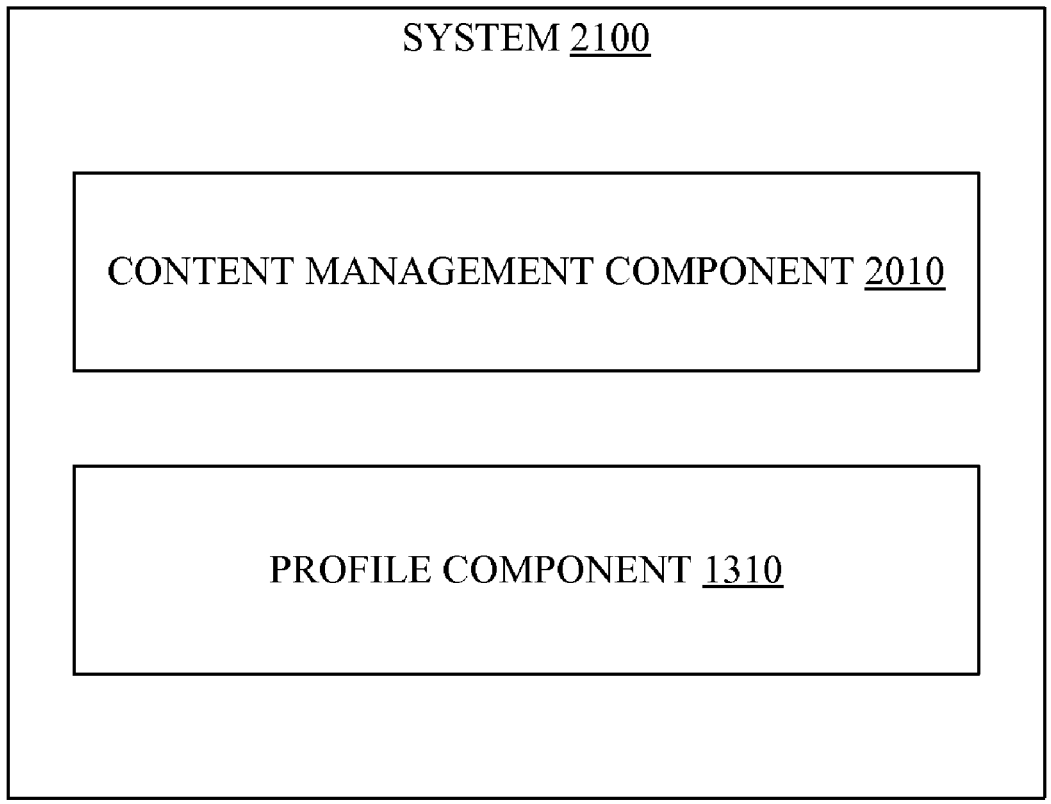
FIG. 21 illustrates a demonstrative system that proactively updates stored multimedia content based on a created and/or updated profile.
Figure 22:
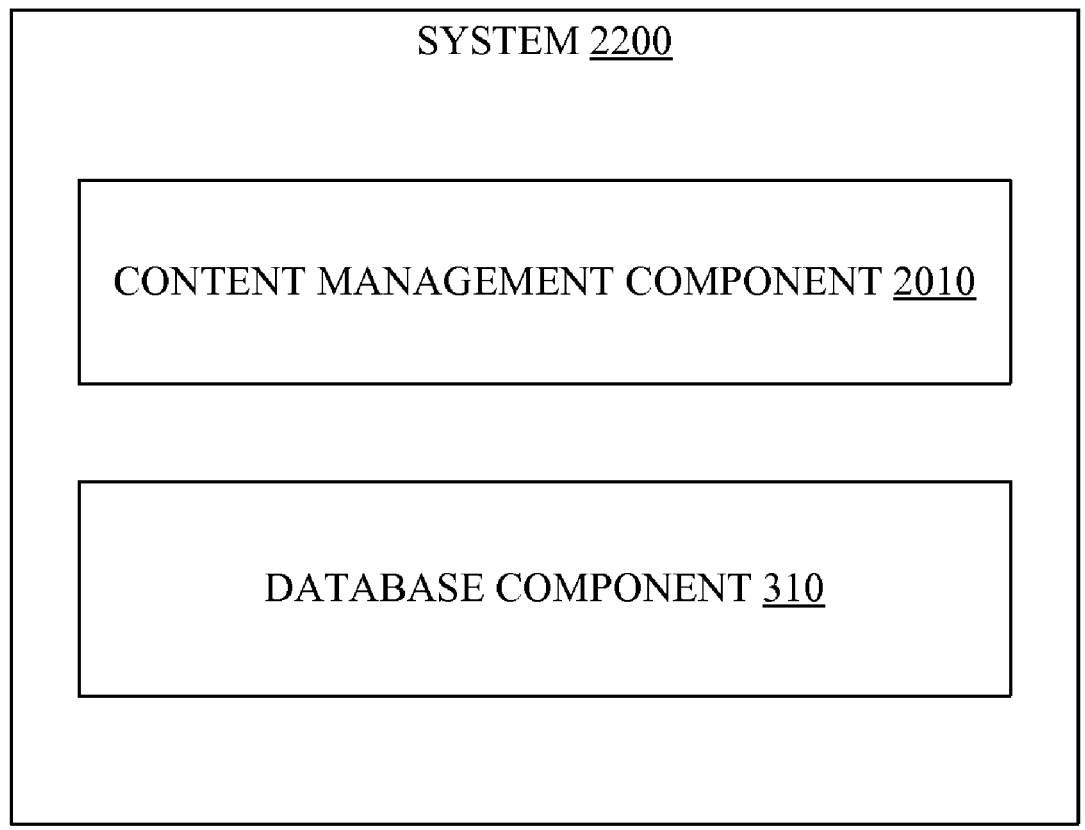
FIG. 22 illustrates a demonstrative system that proactively stores, removes, overwrites, deletes, and/or updates multimedia content in a data store, in accordance with an embodiment.

FIG. 20 illustrates a demonstrative system 2000 that includes a content management component 2010 for effectively selling multimedia content to consumers in a retail establishment, in accordance with an embodiment. In one embodiment (e.g., system 2100 illustrated by FIG. 21), content management component 2010 can proactively update the stored multimedia content based on the profile created and/or updated by profile component 1310. In another embodiment (e.g., system 2200 illustrated by FIG. 22), content management component 2010, via database component 310, can proactively store, remove, overwrite, delete, and/or update multimedia content in a data store associated with database component 310. In yet another embodiment (not shown), content management component 2010 can optimize reception of multimedia content from a base station based on the profile created and/or updated by profile component 1310. In one embodiment (not shown), content management component 2010 can optimize storage of multimedia content in the data store based on the profile created and/or updated by profile component 1310. For example, content management component 2010 can update multimedia content in the data store based on one or more usage and/or purchase profiles associated with a related multimedia based kiosk.

In another embodiment, content management component 2010 can overwrite portions of the data store associated with least transferred and/or recorded multimedia content. In yet another embodiment, content management component 2010 can proactively store sequel(s) and/or prequel(s) of popular movies in the data store to anticipate purchase of such movies. In one embodiment, music and/or movies of a genre similar to music and/or movies transferred and/or recorded can be proactively stored in the data store to anticipate purchase(s) of the music and/or movies.

It should be appreciated that content management component 2010 can store, remove, overwrite, delete, and/or update multimedia content in the data store at any time. For example, content management component 2010 can perform such operations periodically, e.g., every 2 hours. In another example, content management component 2010 can perform such operations during times associated with low-traffic/loading, e.g., at times during low-traffic/loading between system 2000 and one or more other mobile devices; at times during low-traffic/loading between system 2000 and the core network. In yet another example, content management component 2010 can update multimedia content in the data store continuously and/or "on-demand." For example, content management component 2010 can store multimedia content in the data store when a customer requests content that is not contained in the data store.

FIGS. 23-27 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 23:
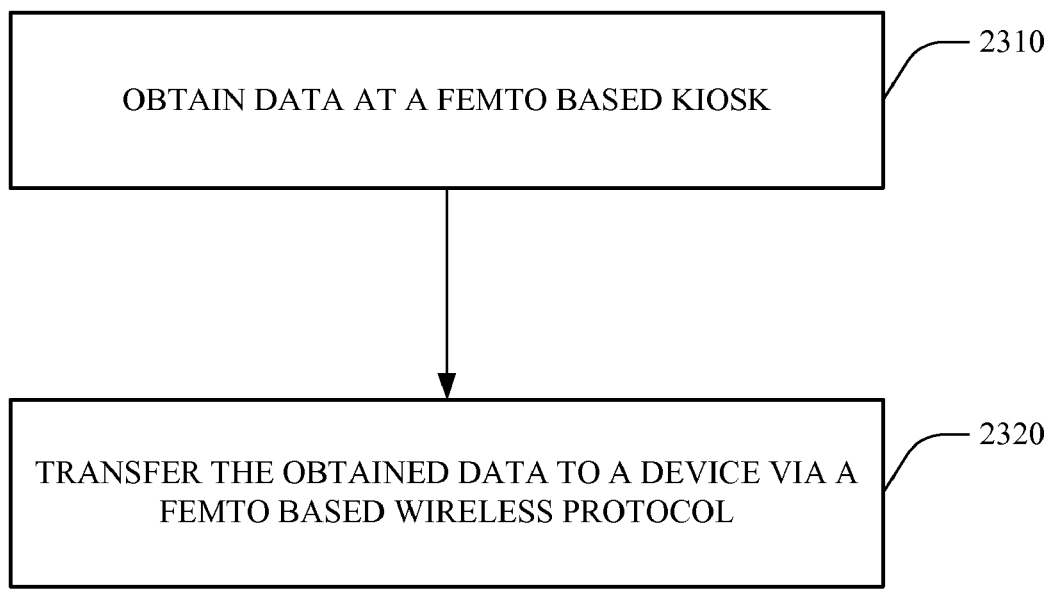
FIG. 23 illustrates a process for effectively selling multimedia content to consumers in a retail establishment, in accordance with an embodiment.

Referring now to FIG. 23, a process 2300 for effectively selling multimedia content to consumers in a retail establishment is illustrated, in accordance with an embodiment. At 2310, a femto based kiosk can obtain data from a core network, e.g., service provider network 155. It should be appreciated that the data can be associated with voice, video, sound, and/or substantially any data-stream or signaling-stream, e.g., digitized audio and/or visual data related to, e.g., a movie, a video game, music, etc. Further, femto based kiosk can obtain the data from the core network utilizing various cellular wireless technologies, e.g., Third Generation Partnership Project (3GPP) Universal Mobile Telecommunication System (UMTS), Global System for Mobile Communication (GSM), etc.

Figure 24:
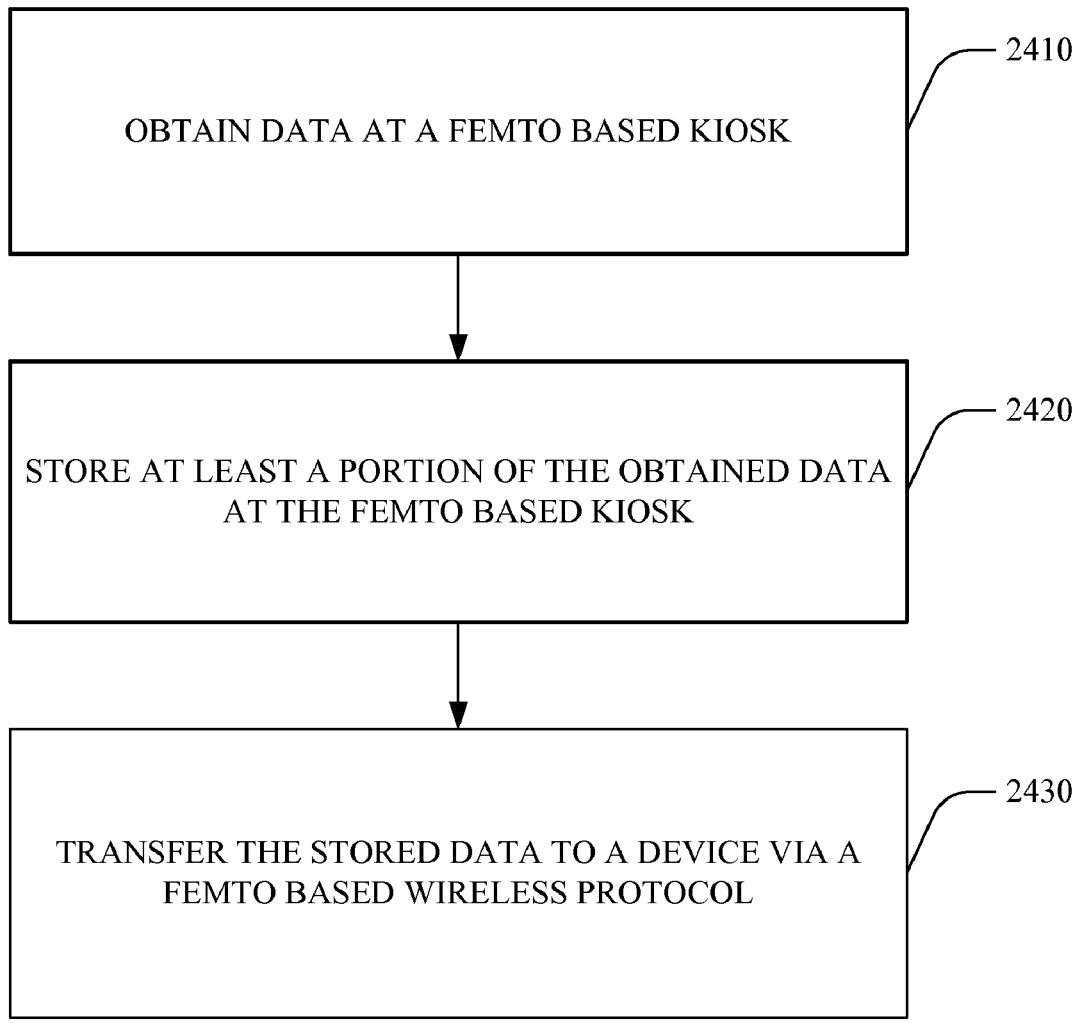
FIG. 24 illustrates another process for effectively selling multimedia content to consumers in a retail establishment, in accordance with an embodiment, in accordance with an embodiment.

At 2320, the femto based kiosk, e.g., system 200, can transfer the obtained data to a device, e.g., UE $120_A$ and/or subscriber station $120_B$ illustrated by FIG. 1, via a femto based wireless protocol. FIG. 24 illustrates another process (e.g., process 2400) for effectively selling multimedia content to consumers in a retail establishment, in accordance with an embodiment. At 2410, the femto based kiosk can obtain data from the core network. At least a portion of the obtained data can be stored at the femto based kiosk at 2420, e.g., utilizing a removable and/or non-removable storage medium. At 2430, the femto based kiosk can transfer the stored data to the device via a femto based wireless protocol.

Figure 25:
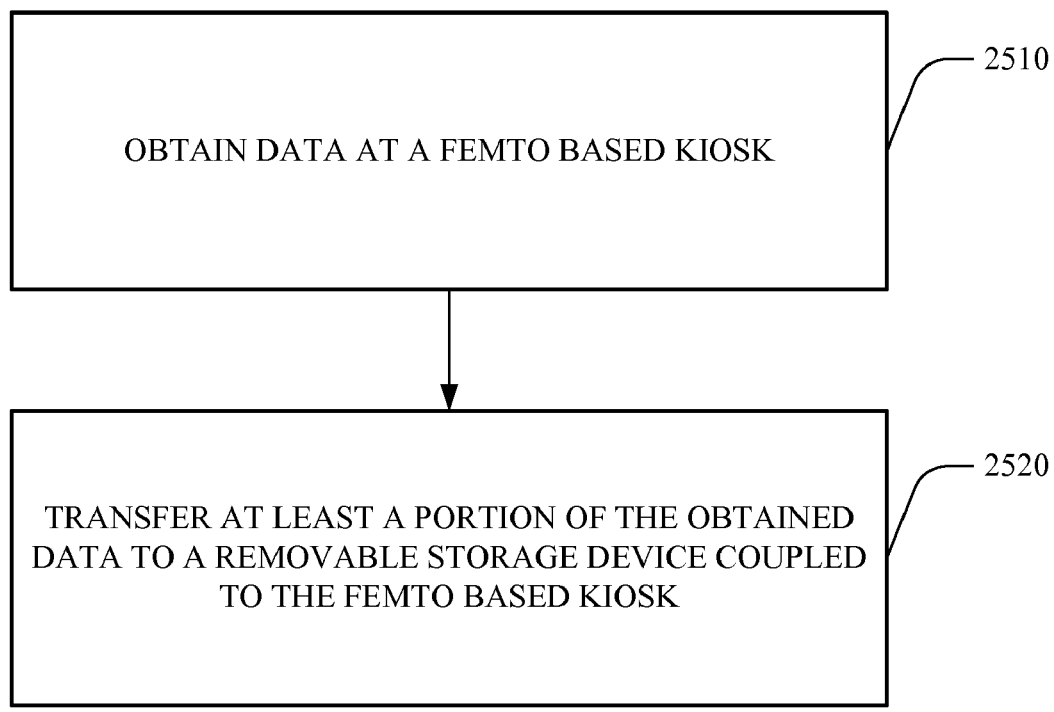
FIG. 25 illustrates yet another process for effectively selling multimedia content to consumers in a retail establishment, in accordance with an embodiment.

FIG. 25 illustrates yet another process (e.g., 2500) for effectively selling multimedia content to consumers in a retail establishment, in accordance with an embodiment. A femto based kiosk, e.g., system 200, can obtain data, e.g., digitized audio and/or visual data related to, e.g., a movie, a video game, music, etc., from a core network at 2510. At 2520, the femto based kiosk can transfer at least a portion of the obtained data to a removable storage device coupled to the femto based kiosk. For example, the removable storage device can include a memory stick, universal serial bus (USB) memory device, CD, DVD, BD, etc.

Figure 26:
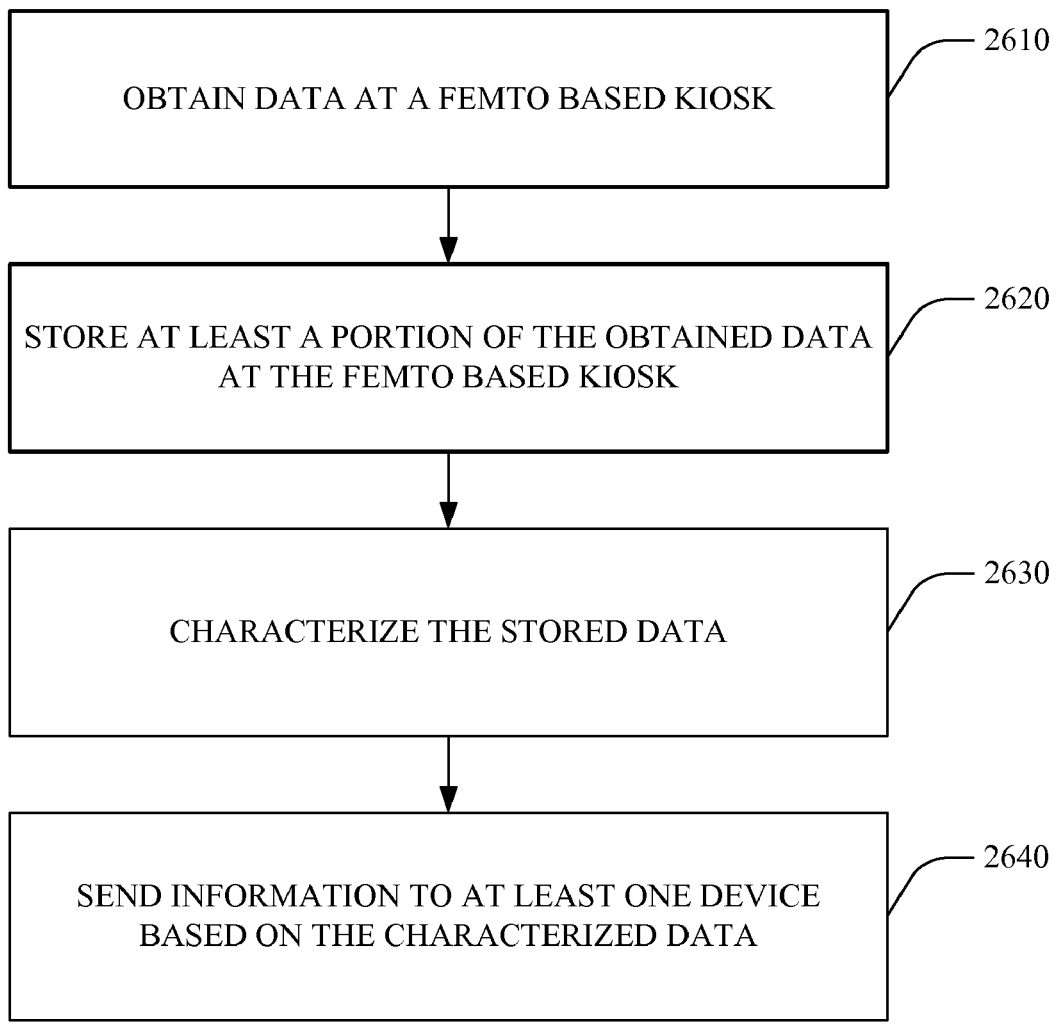
FIG. 26 illustrates a process for sending information to at least one device based on characterized data, in accordance with an embodiment.

FIG. 26 illustrates a process 2600 for sending information to at least one device based on characterized data, in accordance with an embodiment. At 2610, a femto based kiosk can obtain data. The femto based kiosk can store at least part of the data in a memory component of the femto based kiosk at 2620. At 2630, the stored data can be characterized, e.g., to determine a type and/or form of content associated with data stored at the femto based kiosk. Femto based kiosk, at 2640, can send information, e.g., advertisements, content stored/associated with the femto based kiosk, to at least one device base on the characterized data.

Figure 27:
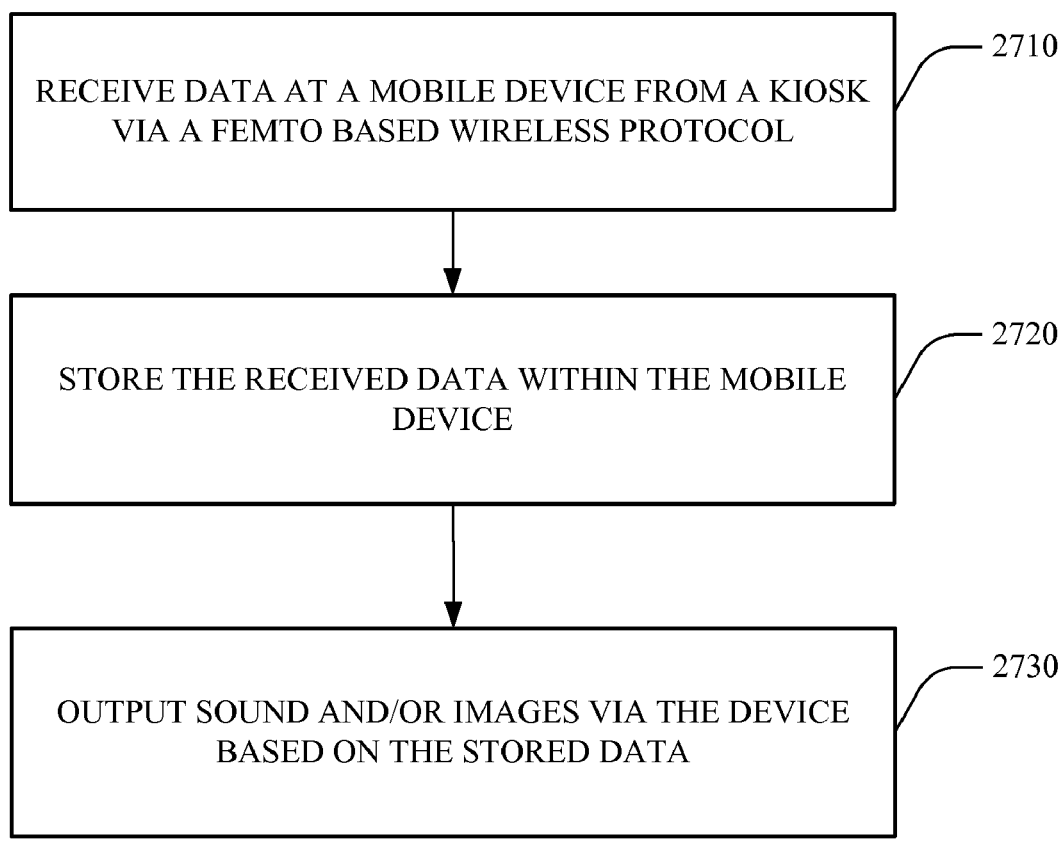
FIG. 27 illustrates a process associated with a mobile device, in accordance with an embodiment.

FIG. 27 illustrates a process 2700 associated with a mobile device, in accordance with an embodiment. At 2710, the mobile device, e.g., UE $120_A$ and/or subscriber station $120_B$ illustrated by FIG. 1, can receive data, e.g., digitized audio and/or visual data related to, e.g., a movie, a video game, music, etc., from a kiosk, e.g., system 200, via a femto based wireless protocol. The received data can be stored within the mobile device at 2720. At 2730, the mobile device can generate sound and/or images, e.g., play a movie, music video, music, etc., based on the stored data. It should be appreciated that the mobile device can generate the sound and/or images via various components such as decoders, codecs, digital-to-analog converters, display devices (e.g., liquid crystal displays (LCDs)), sound devices (e.g., speakers), etc. In another embodiment (not shown), the mobile device can alternatively transfer the stored data to another device for video and/or audio playback.

Figure 28:
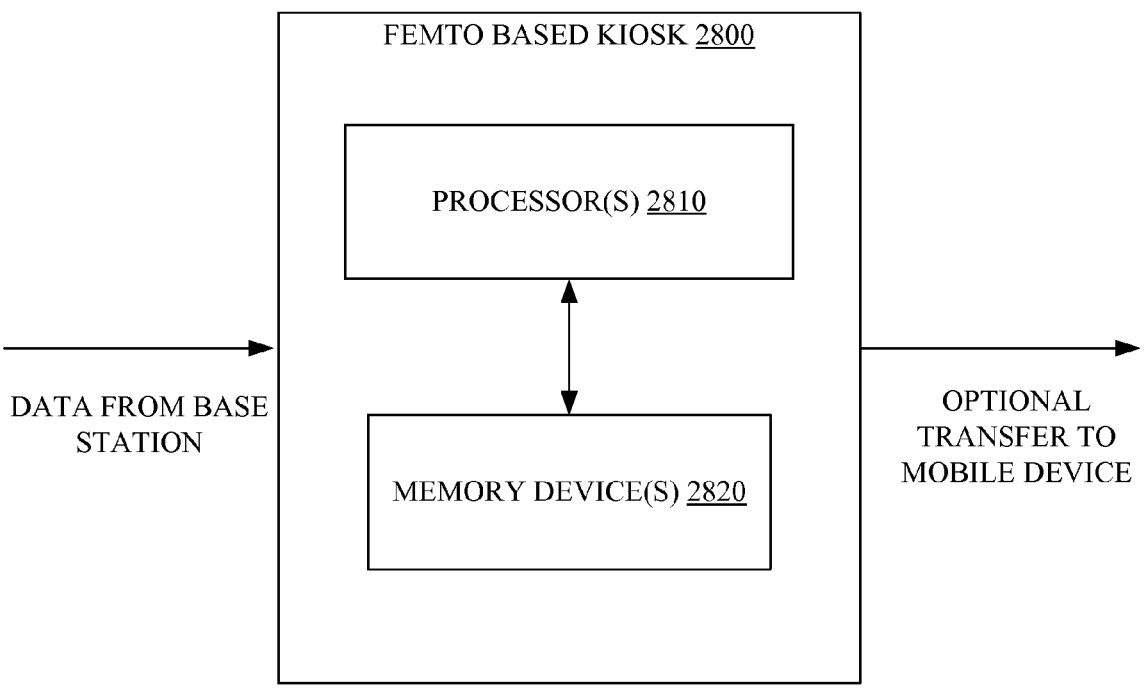
FIG. 28 illustrates a block diagram of a femto based kiosk, in accordance with an embodiment.

FIG. 28 illustrates a block diagram of a femto based kiosk 2800, in accordance with an embodiment. Femto based kiosk 2800, as illustrated by FIG. 28, can perform the acts described above, e.g., related to the discussion of FIGS. 2-26. For example, processor(s) 2810 can store data received by femto based kiosk 2800 (e.g., utilizing memory device(s) 1020). In addition, processors(s) 2810 can transfer the stored data to a mobile device via a femto based wireless protocol. In another example, processors(s) 2810, utilizing memory device(s) 2820, can characterize the stored data and send information to at least one device based on the characterized data.

Figure 29:
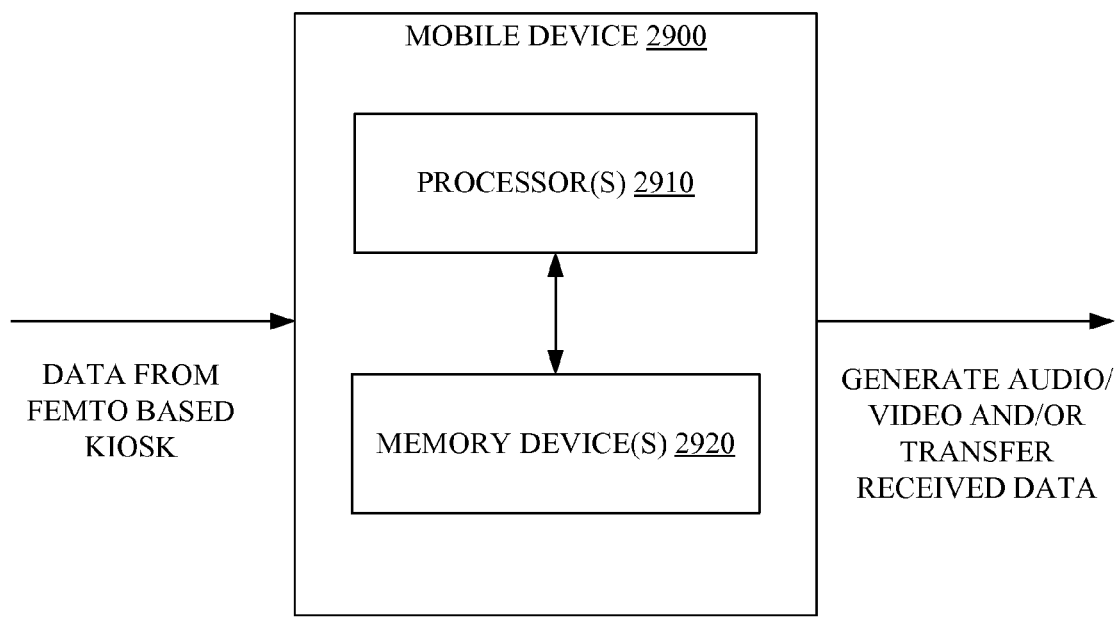
FIG. 29 illustrates a block diagram of a mobile device, in accordance with an embodiment.

FIG. 29 illustrates a block diagram of a mobile device 2900, in accordance with an embodiment. Mobile device 2900, as illustrated by FIG. 29, can perform the acts described above, e.g., related to the discussion of FIG. 27. For example, processor(s) 2910 can receive data from a femto based kiosk (e.g., 2800) via a femto based wireless protocol. In addition, processors(s) 2910 can store the received data within the mobile device utilizing, e.g., memory devices 2920. In another example, mobile device 2900 can transfer received data to another device, e.g., home theater multimedia system.

Figure 30:
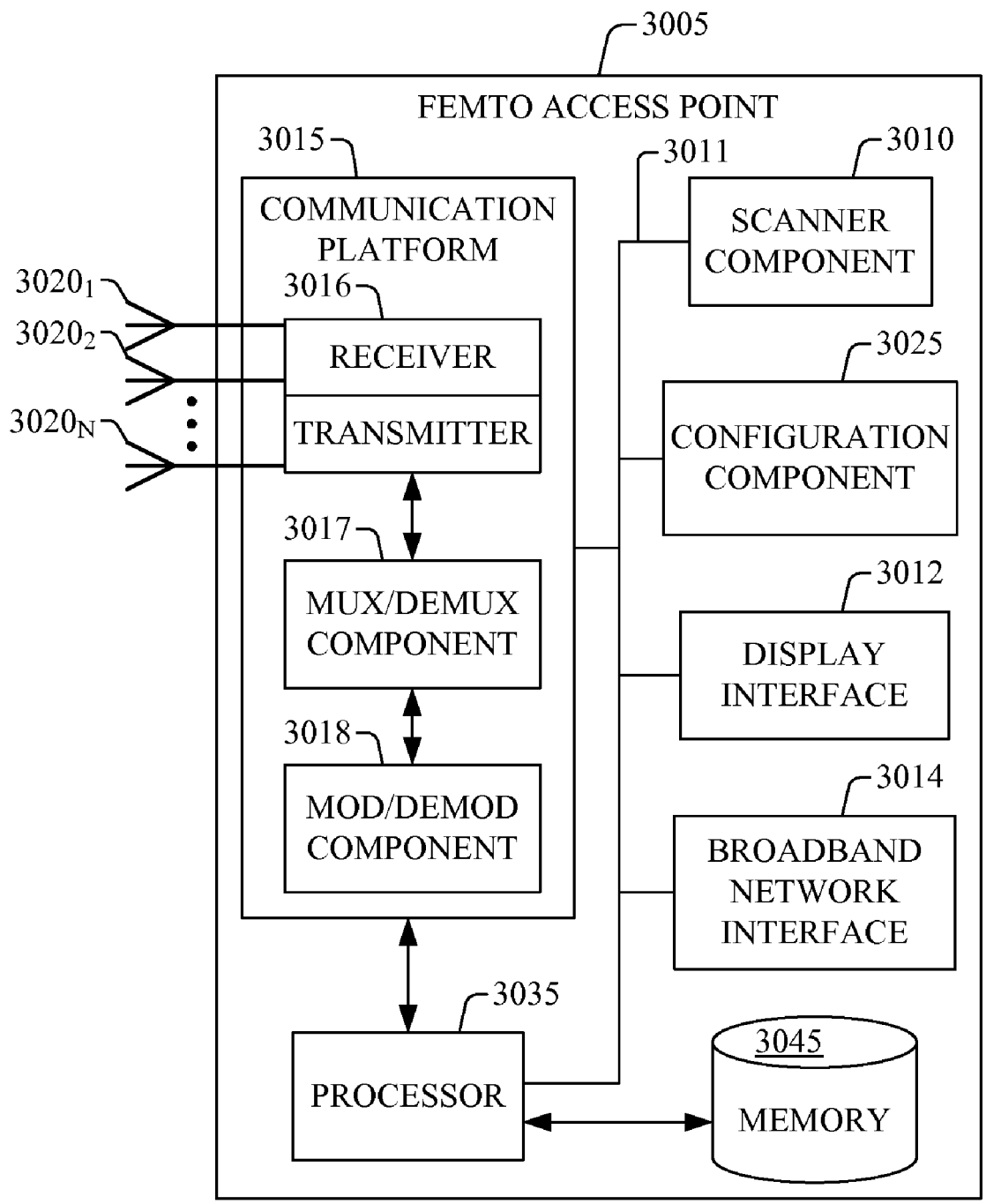
FIG. 30 illustrates a block diagram of a femto access point, in accordance with an embodiment.
Figure 31:
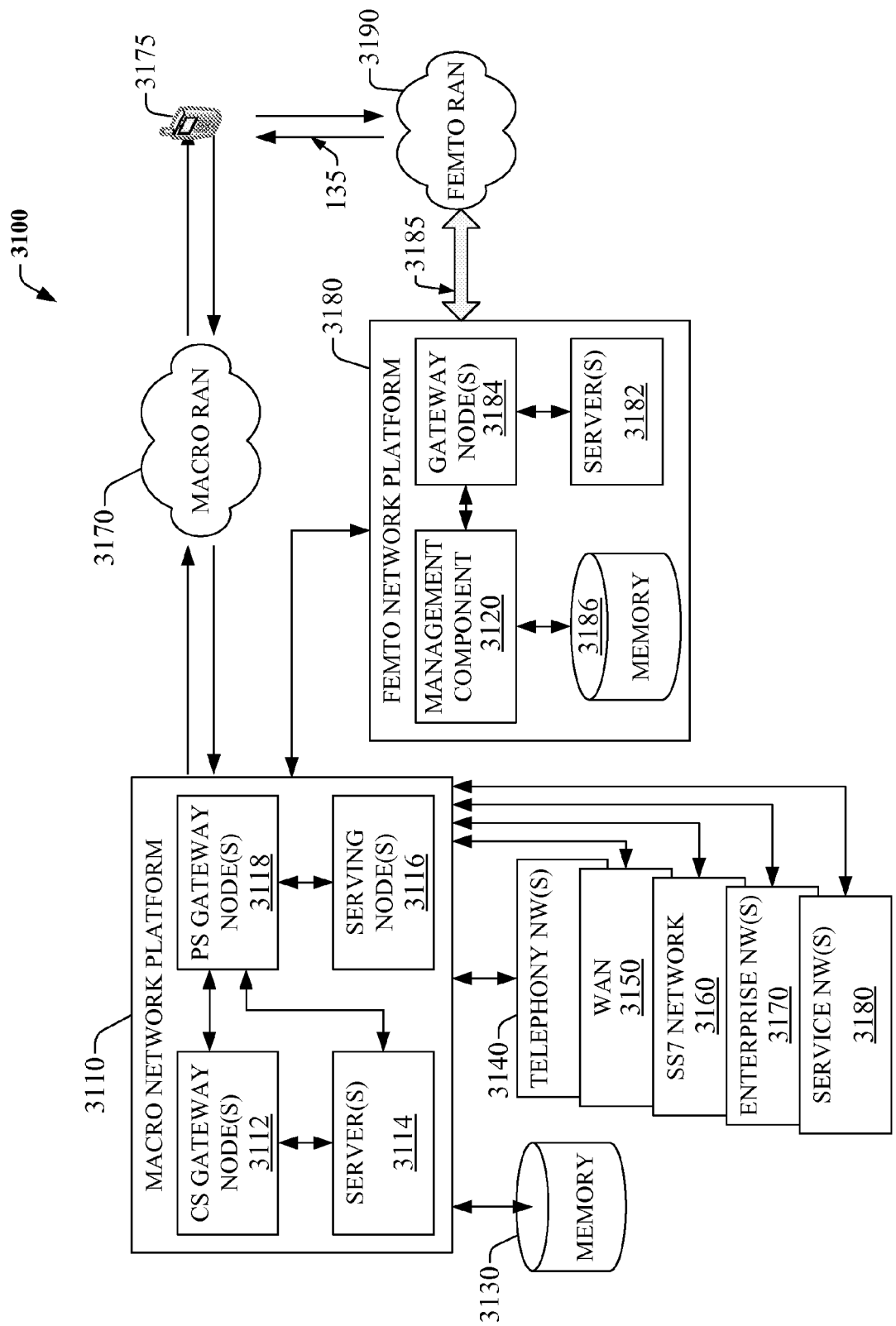
FIG. 31 illustrates a block diagram of a wireless network environment, in accordance with an embodiment.

To provide further context for various aspects of the disclosed subject matter, FIGS. 30 and 31 illustrate, respectively, a block diagram of an embodiment 3000 of a femto cell access point that can enable or exploit features or aspects of the disclosed subject matter; and a wireless network environment 3100 that includes femto and macro network platforms, can enable aspects or feature of a mobile network platform as described herein, and utilizes femto APs that exploit aspects of the subject innovation in accordance with various aspects of the subject specification. In embodiment 3000, femto AP 3005 can receive and transmit signal(s) (e.g., attachment signaling) from and to wireless devices, e.g., femto access points, access terminals, wireless ports and routers, or the like, through a set of antennas $3020_1$-$3020_N$ (N is a positive integer). Antennas $3020_1$-$3020_N$ are a part of communication platform 3015, which comprises electronic components and associated circuitry that provides for processing and manipulation of received signal(s) and signal(s) to be transmitted.

In an aspect, communication platform 3015 includes a receiver/transmitter 3016 that can convert analog signals to digital signals upon reception of the analog signals, and convert digital signals to analog signals upon transmission. In addition, receiver/transmitter 3016 can divide a single data stream into multiple, parallel data streams, or perform the reciprocal operation. Coupled to receiver/transmitter 3016 is a multiplexer/demultiplexer 3017 that facilitates manipulation of signal in time and frequency space. Electronic component 3017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 3017 can scramble and spread information (e.g., codes) according to substantially any code known in the art, e.g., Hadamard-Walsh codes, Baker codes, Kasami codes, polyphase codes, etc. A modulator/demodulator 3018 is also a part of communication platform 3015, and can modulate information according to multiple modulation techniques, such as frequency modulation, amplitude modulation, e.g., M-ary quadrature amplitude modulation (QAM), with M a positive integer), phase-shift keying (PSK), etc.

Femto access point 3005 also includes a processor 3035 configured to confer, at least in part, functionality to substantially any electronic component in femto AP 3005. In particular, processor 3035 can facilitate configuration of femto AP 3005, via configuration component 3025, and one or more component therein. Additionally, femto AP 3005 includes display interface 3012, which can display functions that control functionality of femto AP 3005, or reveal operation conditions thereof. In addition, display interface 3012 can include a screen to convey information to an end user. In an aspect, display interface 3012 can be a liquid crystal display (LCD), a plasma panel, a monolithic thin-film based electrochromic display, and so on. Moreover, display interface can also include a component (e.g., speaker) that facilitates communication of aural indicia, which can also be employed in connection with messages that convey operational instructions to an end user. Display interface 3012 also facilitates data entry e.g., through a linked keypad or via touch gestures, which can facilitated femto AP 3005 to receive external commands, e.g., restart operation.

Broadband network interface facilitates connection of femto AP 3005 to femto network via access point backhaul link(s) 153 (not shown in FIG. 30), which enables incoming and outgoing data flow. Broadband network interface 3014 can be internal or external to femto AP 3005, and it can utilize display interface 3012 for end-user interaction and status information delivery.

Processor 3035 also is functionally connected to communication platform 3015 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 3035 is functionally connected, via data, system, or address bus 3011, to display interface 3012 and broadband network interface 3014 to confer, at least in part functionality to each of such components.

In femto AP 3005, memory 3045 can retain location and/or home macro sector identifier(s) (e.g., HMS ID(s) 448); access list(s) (e.g., access list(s) 446) that authorized access to wireless coverage through femto 3005; sector intelligence (e.g., sector intel 442) which includes ranking of macro sectors in the macro wireless environment of femto AP 3005, radio link quality and strength associated therewith, or the like. Memory 3045 also can store data structures, code instructions and program modules, system or device information, code sequences for scrambling, spreading and pilot transmission, femto AP floor plan configuration, and so on. Processor 3035 is coupled, e.g., via a memory bus, to the memory 3045 in order to store and retrieve information necessary to operate and/or confer functionality to the components, platform, and interface that reside within femto access point 3005.

With respect to FIG. 31, wireless communication environment 3100 includes two wireless network platforms: (1) macro network platform 3110 that serves, or facilitates communication with, user equipment 3175, e.g., mobile device 2900, via a macro radio access network (RAN) 3170. It should be appreciated that in cellular wireless technologies (e.g., 3GPP UMTS, HSPA, 3GPP LTE, 3GPP2UMB), macro network platform 3110 is embodied in a core network; and (2) femto network platform 3180, which can provide communication with UE 3175 through a femto RAN 3190, which is linked to the femto network platform 3180 via backhaul pipe(s) 3185, e.g., access point backhaul link(s) 153. It should be appreciated that macro network platform 3110 typically hands off UE 3175 to femto network platform 3110 once UE 3175 attaches, e.g., through macro-to-femto handover, to femto RAN 3190, which includes a set of deployed femto APs (e.g., femto AP 130) that can operate in accordance with aspects described herein.

It is noted that RAN includes base station(s), or access point(s), and its associated electronic circuitry and deployment site(s), in addition to a wireless radio link operated in accordance with the base station(s). Accordingly, macro RAN 3170 can comprise various coverage cells like cell 105, while femto RAN 3190 can comprise multiple femto cell access points such as femto AP 130. Deployment density in femto RAN 3190 is substantially higher than in macro RAN 3170.

Generally, both macro and femto network platforms 3110 and 3180 include components, e.g., nodes, gateways, interfaces, servers, or platforms, that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 3110 includes CS gateway node(s) 3112 which can interface CS traffic received from legacy networks like telephony network(s) 3140, e.g., public switched telephone network (PSTN), or public land mobile network (PLMN), or a SS7 network 3160. Circuit switched gateway 3112 can authorize and authenticate traffic, e.g., voice, arising from such networks. Additionally, CS gateway 3112 can access mobility, or roaming, data generated through SS7 network 3160; for instance, mobility data stored in a VLR, which can reside in memory 3130. Moreover, CS gateway node(s) 3112 interfaces CS-based traffic and signaling and gateway node(s) 3118. As an example, in a 3GPP UMTS network, PS gateway node(s) 3118 can be embodied in gateway GPRS support node(s) (GGSN).

In addition to receiving and processing CS-switched traffic and signaling, PS gateway node(s) 3118 can authorize and authenticate PS-based data sessions with served, e.g., through macro RAN, wireless devices. Data sessions can include traffic exchange with networks external to the macro network platform 3110, like wide area network(s) (WANs) 3150, enterprise networks (NWs) 3170, e.g., enhanced 911, or service NW(s) 3180 like IP multimedia subsystem (IMS). It should be appreciated that local area network(s) (LANs), which may be a part of enterprise NW(s), can also be interfaced with macro network platform 3110 through PS gateway node(s) 3118. Packet-switched gateway node(s) 3118 generates packet data contexts when a data session is established. To that end, in an aspect, PS gateway node(s) 3118 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 3114. It is to be noted that in 3GPP UMTS network(s), PS gateway node(s) 3118 (e.g., GGSN) and tunnel interface (e.g., TTG) comprise a packet data gateway (PDG).

Macro network platform 3110 also includes serving node (s) 3116 that convey the various packetized flows of information, or data streams, received through PS gateway node(s) 3118. As an example, in a 3GPP UMTS network, serving node(s) can be embodied in serving GPRS support node(s) (SGSN).

As indicated above, server(s) 3114 in macro network platform 3110 can execute numerous applications, e.g., location services, online gaming, wireless banking, wireless device management, etc. that generate multiple disparate packetized data streams or flows, and manage such flows, e.g., schedule, queue, format. Such application(s), for example can include add-on features to standard services provided by macro network platform 3110. Data streams can be conveyed to PS gateway node(s) 3118 for authorization/authentication and initiation of a data session, and to serving node(s) 3116 for communication thereafter. Server(s) 3114 can also effect security, e.g., implement one or more firewalls, of macro network platform 3110 to ensure network's operation and data integrity in addition to authorization and authentication procedures that CS gateway node(s) 3112 and PS gateway node(s) 3118 can enact. Moreover, server(s) 3114 can provision services from external network(s), e.g., WAN 3150, or Global Positioning System (GPS) network(s), which can be a part of enterprise NW(s) 3180. It is to be noted that server(s) 3114 can include one or more processors configured to confer at least in part the functionality of macro network platform 3110. To that end, the one or more processors can execute code instructions stored in memory 3130, for example.

In example wireless environment 3100, memory 3130 stores information related to operation of macro network platform 3110. Information can include business data associated with subscribers; market plans and strategies, e.g., promotional campaigns, business partnerships; operational data for mobile devices served through macro network platform; service and privacy policies; end-user service logs for law enforcement; and so forth. Memory 3130 can also store information from at least one of telephony network(s) 3140, WAN 3150, SS7 network 3160, enterprise NW(s) 3170, or service NW(s) 3180.

Regarding femto network platform 3180, it includes femto gateway node(s) 3184, which have substantially the same functionality as PS gateway node(s) 3118. Additionally, femto gateway node(s) 3184 can also include substantially all functionality of serving node(s) 3116. Disparate gateway node(s) 3184 can control or operate disparate sets of deployed femto APs, which can be a part of femto RAN 3190. In an aspect of the subject innovation, femto gateway node(s) 3184 can aggregate operational data received from deployed femto APs. Moreover, femto gateway node(s) 3184, can convey received attachment signaling to attachment component 3120. It should be appreciated that while attachment component is illustrated as external to gateway node(s) 3184, attachment component 3120 can be an integral part of gateway node(s) 3184.

Memory 3186 can retain additional information relevant to operation of the various components of femto network platform 3180. For example, operational information that can be stored in memory 3186 can comprise, but is not limited to, subscriber intelligence; contracted services; maintenance and service records; femto cell configuration, e.g., devices served through femto RAN 3190, authorized subscribers associated with one or more deployed femto APs; service policies and specifications; privacy policies; add-on features; so forth.

Server(s) 3182 have substantially the same functionality as described in connection with server(s) 3114. In an aspect, server(s) 3182 can execute multiple application(s) that provide service, e.g., voice and data, to wireless devices served through femto RAN 3190. Server(s) 3182 can also provide security features to femto network platform. In addition, server(s) 3182 can manage, e.g., schedule, queue, format, substantially all packetized flows, e.g., IP-based, frame relay-based, ATM-based, it generates in addition to data received from macro network platform 3110. Furthermore, server(s) 3182 can effect provisioning of femto cell service, and effect operations and maintenance. It is to be noted that server(s) 3182 can include one or more processors configured to provide at least in part the functionality of femto network platform 3180. To that end, the one or more processors can execute code instructions stored in memory 3186, for example.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "data store," "data storage," "database," and substantially any other information storage component relevant to operation and functionality of a component, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 32:
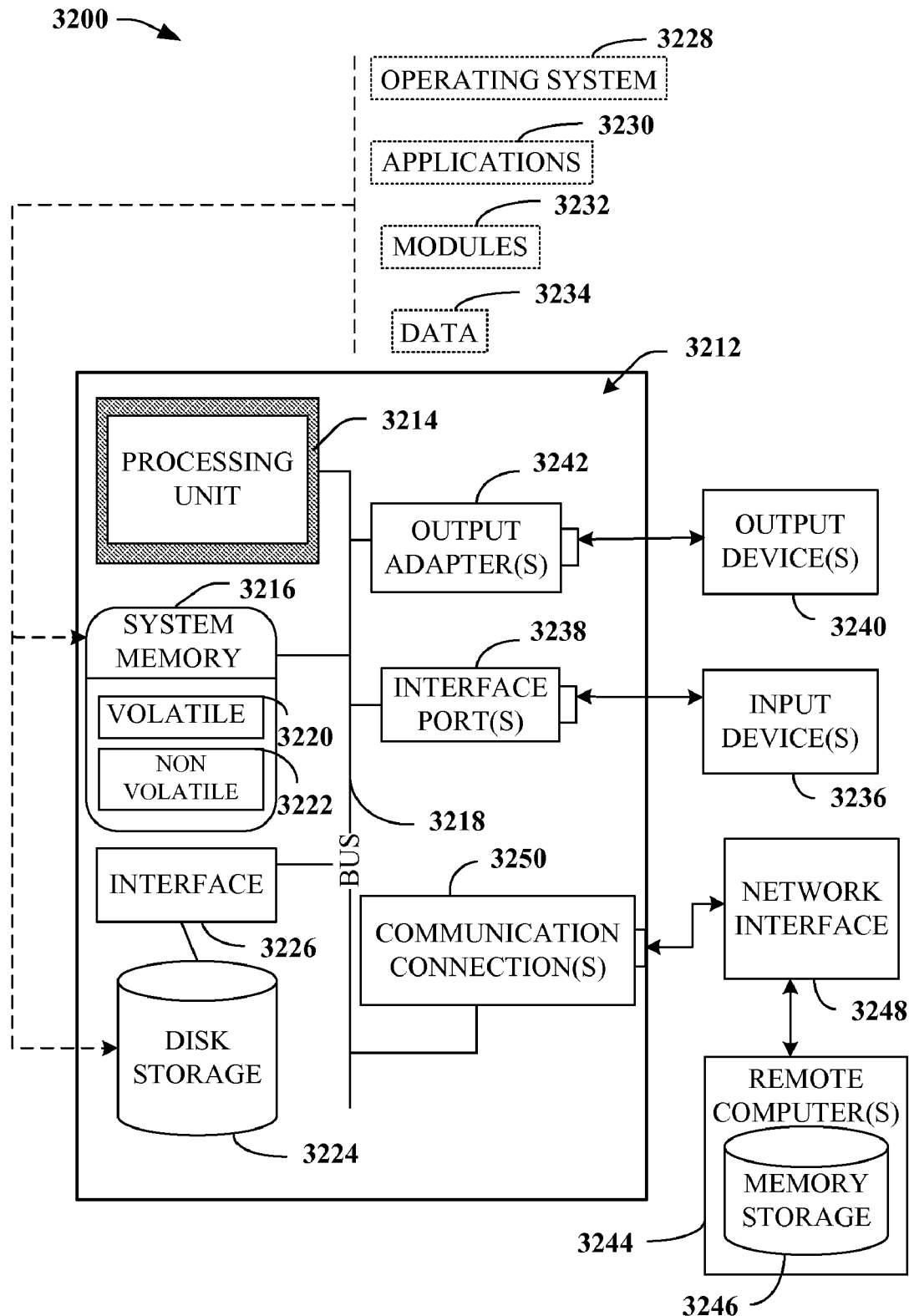
FIG. 32 illustrates a block diagram of a computer operable to execute the disclosed methods and apparatus, in accordance with an embodiment.
Figure 33:
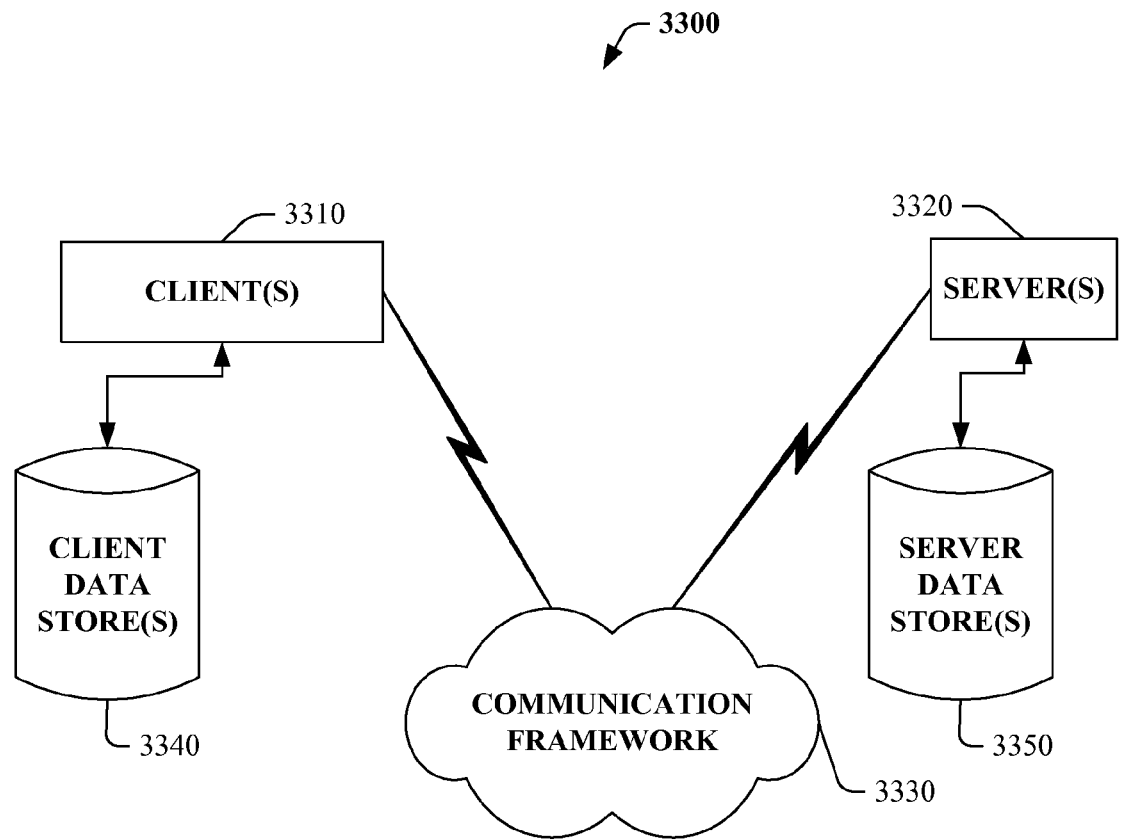
FIG. 33 illustrates a schematic block diagram of an exemplary computing environment, in accordance with an embodiment.

In order to provide a context for the various aspects of the disclosed subject matter, FIGS. 32 and 33, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network; however, some if not all aspects of the subject disclosure can be practiced on stand-alone computers. In a distributed computing environment, program modules may be located in both local and remote memory storage devices.

With reference to FIG. 32, a block diagram of a computer 3200 operable to execute the disclosed systems and methods, in accordance with an embodiment, includes a computer 3212. The computer 3212 includes a processing unit 3214, a system memory 3216, and a system bus 3218. The system bus 3218 couples system components including, but not limited to, the system memory 3216 to the processing unit 3214. The processing unit 3214 can be any of various available processors. Dual microprocessors and other multiprocessor architectures also can be employed as the processing unit 3214.

The system bus 3218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 3216 includes volatile memory 3220 and nonvolatile memory 3222. The basic input/output system (BIOS), containing the basic routines to transfer information between elements within the computer 3212, such as during start-up, is stored in nonvolatile memory 3222. By way of illustration, and not limitation, nonvolatile memory 3222 can include ROM, PROM, EPROM, EEPROM, or flash memory. Volatile memory 3220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 3212 also includes removable/non-removable, volatile/non-volatile computer storage media. FIG. 32 illustrates, for example, disk storage 3224. Disk storage 3224 includes, but is not limited to, devices like a magnetic disk drive, floppy disk drive, tape drive, Jaz drive, Zip drive, LS-100 drive, flash memory card, or memory stick. In addition, disk storage 3224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 3224 to the system bus 3218, a removable or non-removable interface is typically used, such as interface 3226.

It is to be appreciated that FIG. 32 describes software that acts as an intermediary between users and the basic computer resources described in the suitable operating environment 3200. Such software includes an operating system 3228. Operating system 3228, which can be stored on disk storage 3224, acts to control and allocate resources of the computer system 3212. System applications 3230 take advantage of the management of resources by operating system 3228 through program modules 3232 and program data 3234 stored either in system memory 3216 or on disk storage 3224. It is to be appreciated that the disclosed subject matter can be implemented with various operating systems or combinations of operating systems.

A user enters commands or information into the computer 3211 through input device(s) 3236. Input devices 3236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3214 through the system bus 3218 via interface port(s) 3238. Interface port(s) 3238 include, for example, a serial port, a parallel port, a game port, and a universal serial bus (USB). Output device(s) 3240 use some of the same type of ports as input device(s) 3236.

Thus, for example, a USB port may be used to provide input to computer 3212, and to output information from computer 3212 to an output device 3240. Output adapter 3242 is provided to illustrate that there are some output devices 3240 like monitors, speakers, and printers, among other output devices 3240, which require special adapters. The output adapters 3242 include, by way of illustration and not limitation, video and sound cards that provide a means of connection between the output device 3240 and the system bus 3218. It should be noted that other devices and/or systems of devices provide both input and output capabilities such as remote computer(s) 3244.

Computer 3212 can operate in a networked environment using logical connections to one or more remote computers, such as remote computer(s) 3244. The remote computer(s) 3244 can be a personal computer, a server, a router, a network PC, a workstation, a microprocessor based appliance, a peer device or other common network node and the like, and typically includes many or all of the elements described relative to computer 3212.

For purposes of brevity, only a memory storage device 3246 is illustrated with remote computer(s) 3244. Remote computer(s) 3244 is logically connected to computer 3212 through a network interface 3248 and then physically connected via communication connection 3250. Network interface 3248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3250 refer(s) to the hardware/software employed to connect the network interface 3248 to the bus 3218. While communication connection 3250 is shown for illustrative clarity inside computer 3212, it can also be external to computer 3212. The hardware/software necessary for connection to the network interface 3248 includes, for exemplary purposes only, internal and external technologies such as, modems including regular telephone grade modems, cable modems and DSL modems, ISDN adapters, and Ethernet cards.

FIG. 33 illustrates a schematic block diagram of an exemplary computing environment 3330, in accordance with an embodiment. The system 3300 includes one or more client(s) 3310. The client(s) 3310 can be hardware and/or software (e.g., threads, processes, computing devices). The system 3300 also includes one or more server(s) 3320. Thus, system 3300 can correspond to a two-tier client server model or a multi-tier model (e.g., client, middle tier server, data server), amongst other models. The server(s) 3320 can also be hardware and/or software (e.g., threads, processes, computing devices). The servers 3320 can house threads to perform transformations by employing the subject innovation, for example. One possible communication between a client 3310 and a server 3320 may be in the form of a data packet transmitted between two or more computer processes.

The system 3300 includes a communication framework 3330 that can be employed to facilitate communications between the client(s) 3310 and the server(s) 3320. The client (s) 3310 are operatively connected to one or more client data store(s) 3340 that can be employed to store information local to the client(s) 3310. Similarly, the server(s) 3320 are operatively connected to one or more server data store(s) 3350 that can be employed to store information local to the servers 3320.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
   a content component configured to receive, at a femto based information device, multimedia content from a base station coupled to a core network;
   a notice component configured to:
   receive, at the femto based information device via a femto based wireless protocol, a location area update that is associated with a location area code from a mobile device, and
   transmit, from the femto based information device via the femto based wireless protocol, a notification associated with the multimedia content to the mobile device based on the location area update; and
   a transfer component configured to wirelessly transfer from the femto based information device a subset of the multimedia content to the mobile device utilizing the femto based wireless protocol in response to a sale of the subset of the multimedia content.

2. The system of claim 1, further comprising:
   a storage component configured to store the multimedia content in a data store as stored multimedia content.

3. The system of claim 2, wherein the transfer component is further configured to record the stored multimedia content in a removable data storage device based on the sale of the subset of the multimedia content.

4. The system of claim 1, further comprising:
   an encoding component configured to:
   receive a hardware indicator from the mobile device, and
   determine a scheme for encoding the multimedia content based on the hardware indicator.

5. The system of claim 4, wherein the encoding component is further configured to encode, based on a video resolution associated with a display of the mobile device, the multimedia content to yield encoded multimedia content; and wherein the transfer component is further configured to wirelessly transfer the encoded multimedia content to the mobile device utilizing the femto based wireless protocol.

6. The system of claim 1, further comprising:
an access component configured to control a purchase of the subset of the multimedia content based on information that is associated with the mobile device.

7. The system of claim 1, further comprising:
a tracking component configured to track a location of the mobile device based on the location area update.

8. The system of claim 1, further comprising:
an advertisement component configured to transmit information to the mobile device comprising incentives for purchase of the multimedia content.

9. The system of claim 1, further comprising:
a profile component configured to update a profile associated with the subset of the multimedia content.

10. The system of claim 9, wherein the profile component is further configured to:
monitor a number of times the subset of the multimedia content is wirelessly transferred to the mobile device; and
update the profile based on the number of times the subset of the multimedia content is wirelessly transferred to the mobile device.

11. The system of claim 10, wherein the profile component is further configured to:
update the profile based on the subset of the multimedia content that is most transferred to the mobile device.

12. The system of claim 9, wherein the profile component is further configured to:
update the profile based on a genre associated with the subset of the multimedia content.

13. The system of claim 9, wherein the profile component is further configured to:
update an other profile associated with the subset of the multimedia content that is transferred to the mobile device; and
characterize the subset of the multimedia content based on the other profile.

14. The system of claim 9, further comprising:
a content management component configured to update the subset of the multimedia content based on the profile.

15. The system of claim 1, further comprising:
a billing component configured to transmit information associated with the sale to an entity associated with the core network.

16. The system of claim 1, further comprising:
a transfer management component configured to:
report a status of the wireless transfer; and
based on the status, halt the wireless transfer after a portion of the subset of the multimedia content is wirelessly transferred and, in response to the wireless transfer being resumed, wirelessly transfer remaining portions of the multimedia content.

17. The system of claim 1, wherein the notification includes a short message service protocol message.

18. A method, comprising:
receiving, by a femto based information device, data;
receiving, by the femto based information device via a femto based wireless protocol, attachment input including a routing area update that is associated with a routing area code;
sending, by the femto based information device via the femto based wireless protocol based on the routing area update, a notification to a mobile device; and
transferring, by the femto based information device via the femto based wireless protocol, at least a subset of the data to the mobile device.

19. The method of claim 18, further comprising:
transferring, by the femto based information device, at least a portion of the data to a removable storage device coupled to the femto based information device.

20. The method of claim 18, further comprising:
characterizing the stored data; and
sending information to the device in response to the characterizing.

21. The method of claim 20, wherein the sending the information includes sending an advertisement to the device.

22. The method of claim 18, wherein the sending further includes sending an offer directed to the mobile device, and wherein the transferring further includes transferring the subset of the data to the mobile device in response to the sending the offer.

23. A method, comprising:
sending, by a mobile device via a femto based wireless protocol, attachment data including a location area update to a femto based information device;
receiving, by the mobile device via the femto based wireless protocol based on the location area update, a notification from the femto based information device regarding data available for download from the femto based information device;
requesting, by the mobile device via the femto based wireless protocol, a subset of the data from the femto based information device;
receiving, by the mobile device via the femto based wireless protocol, the subset of the data from the femto based information device; and
storing the subset of the data within a storage media communicatively coupled to the mobile device.

24. The method of claim 23, further comprising:
outputting, by the mobile device, sound based on the subset of the data.

25. A mobile device comprising:
a transceiver component configured to:
transmit to a femto based information device, via a femto based wireless protocol, attachment information including a location area update;
receive, via the femto based wireless protocol based on the location area update, a notification from the femto based information device;
transmit to the femto based information device, via the femto based wireless protocol, a request for a subset of data associated with the notification; and
receive, via the femto based wireless protocol, the subset of the data from the femto based information device; and
an audio component configured to generate sound based on the subset of the data.

26. The mobile device of claim 25, wherein the transceiver component is further configured to receive the subset of the data from the femto based information device in response to a purchase of the subset of the data.

* * * * *